United States Patent
Ten Kate

[11] Patent Number: 6,023,490
[45] Date of Patent: Feb. 8, 2000

[54] ENCODING APPARATUS FOR ENCODING A PLURALITY OF INFORMATION SIGNALS

[75] Inventor: Warner R. T. Ten Kate, Eindhoven, Netherlands

[73] Assignee: U.S. Philips Corporation, New York, N.Y.

[21] Appl. No.: 08/826,919

[22] Filed: Apr. 9, 1997

[30] Foreign Application Priority Data

Apr. 10, 1996 [EP] European Pat. Off. .............. 96200937
May 8, 1996 [EP] European Pat. Off. .............. 96201259

[51] Int. Cl.[7] ....................................................... H04B 1/66
[52] U.S. Cl. .............................. 375/240; 375/260; 381/22; 381/23; 704/500
[58] Field of Search ..................................... 375/240, 260, 375/295, 316, 377; 381/FOR 100, FOR 101, 22, 23; 704/500, 501, 503, 504

[56] References Cited

U.S. PATENT DOCUMENTS

| | | | |
|---|---|---|---|
| 5,488,665 | 1/1996 | Johnston et al. ............................. | 381/2 |
| 5,632,005 | 5/1997 | Davis et al. ............................. | 395/2.95 |

FOREIGN PATENT DOCUMENTS

0655876A1  5/1995  European Pat. Off. .......... H04S 1/00

*Primary Examiner*—Amanda T. Le
*Attorney, Agent, or Firm*—Dicran Halajian

[57] ABSTRACT

An apparatus for encoding a plurality of n digital information signals is provided with at least a first, second and third input terminal (1,2,3) for receiving a first, a second and a third digital information signal (L,R,C). A matrixing unit (10) is provided for generating a first and a second digital composite signal ($L_0,R_0$) from the at least the first, second and third digital information signals. First and second data compression means (22.1,22.2) are provided for data compressing the first and second composite signal ($L_0,R_0$) so as to obtain first and second data reduced digital composite signals. A first selection unit (16) is provided for selecting at least one information signal from said plurality of n information signals so as to obtain at least a first auxiliary signal ($AUX_1$). At least a third data compression means (22.3) is present for data compressing the at least first auxiliary signal so as to obtain a first data reduced auxiliary signal. A formatting unit (24) is present for combining the first and second data reduced composite signals and the at least first data reduced auxiliary signal into a transmission signal suitable for transmission via a transmission medium. The apparatus further comprises at least first, second and third masked threshold determining means (26.1,26.3,26.4) for determining first ($mt_L$), second ($mt_C$) and third ($mt_{L0}$) masked thresholds respectively. A second selection unit (28.1) is provided for deriving one masked threshold from at least the first ($mt_L$) and third ($mt_{L0}$) masked threshold so as to obtain a first selected masked threshold ($mt_1$). Preferably, said first selected masked threshold is the smallest of the said at least first ($mt_L$) and third ($mt_{L0}$) masked thresholds.

26 Claims, 11 Drawing Sheets

ENCODING APPARATUS FOR ENCODING A PLURALITY OF INFORMATION SIGNALS

FIELD OF THE INVENTION

The invention relates to an encoder apparatus for encoding a plurality of digital information signals into a transmission signal and to a method for encoding the plurality of digital information signals. An encoder apparatus in accordance with the opening paragraph is known from EP 678, 226-A1, which is document (8) in the list of related documents at the end of this description.

BACKGROUND OF THE INVENTION

Matrixing can be carried out when transmitting a first main signal component (the left hand signal component L of a stereo signal), a second main signal component (the right hand signal component R) and an auxiliary component (a central signal component C), such that a first composite signal component $L_0$ is obtained which equals L+a.C and a second composite signal $R_0$ is obtained which equals R+b.C, and where the signals $L_0$, $R_0$ and C are transmitted. Upon reception by a standard receiver not being provided with a corresponding dematrixing circuit, the signal components $L_0$ and $R_0$ are used for supplying via two stereo loudspeakers to a listener. The listener is thus able to perceive the C component transmitted as well, although he has a standard receiver.

More sophisticated matrixing schemes are discussed in J.A.E.S., Vol. 40, No. 5, May 1992, pp. 376–382, as well as in the publication 'Matrixing of bitrate reduced audio signals' by W. R. Th. ten Kate et al, in Proc. of the ICASSP, Mar. 23–26, 1992 San Francisco, Vol.2, pp. II-205 to II-208, documents (1a) and (1b) in the list of references, as well as document (8).

They all satisfy the requirement that, even if a 4-channel (R, L, C and S) signal, or a 5-channel (L, R, C, LS, RS) signal is transmitted, the transmitted signal can be decoded by a standard stereo receiver.

Compression means for bit rate reducing a signal has been described in published European patent applications 457, 390A1 (PHN 13.328) and 457,391A1 (PHN 13.329), the documents (7a) and (7b) respectively in the list of references. Further, reference is made to two ISO/IEC standard documents, the documents (9) and (10) in the list of related documents, referred to as MPEG-1 and MPEG-2 standard documents respectively.

SUMMARY OF THE INVENTION

The invention aims at providing further improvements to an encoder apparatus for encoding a plurality of information signals.

In accordance with the invention, the encoding apparatus for encoding a plurality of n digital information signals, having first input means for receiving a first digital information signal, second input means for receiving a second digital information signal, third input means for receiving a third digital information signal, matrixing means for generating a first and a second digital composite signal from at least the first, second and third digital information signals, first and second data compression means for data compressing the first and second composite signal so as to obtain first and second data reduced digital composite signals, in response to first and second instruction signals respectively, first selection means for selecting at least one information signal from said plurality of n information signals so as to obtain at least a first auxiliary signal, at least a third data compression means for data compressing the at least first auxiliary signal respectively so as to obtain a first data reduced auxiliary signal, in response to a third instruction signal, formatting means for combining the first and second data reduced composite signals and the at least first data reduced auxiliary signal into a transmission signal suitable for transmission via a transmission medium, characterized in that the apparatus further comprises at least first, second and third masked threshold determining means for determining a first masked threshold from the first digital information signal, a second masked threshold from the third digital information signal and a third masked threshold from a combination of at least the first and the third digital information signal, respectively, second selection means for deriving one masked threshold from the third masked threshold and at least one other masked threshold so as to obtain a first selected masked threshold, first instruction signal generator means for generating the first instruction signal in response to said first selected masked threshold, wherein n is an integer for which holds that n is larger than 2.

The invention is based on the following recognition. The invention resides in the objective to provide an n-channel encoder apparatus, which is backwards compatible so as to enable not only n-channel decoding, but also enables a 2-channel decoding using prior art MPEG-2 and MPEG-1 decoders respectively. Such encoder apparatus is meant to encode the three or more information signals introduced above, namely the signals for a left front loudspeaker, a right front loudspeaker and a center loudspeaker, and in the case of a 4-channel signal a surround signal component, and in the case of a 5-channel signal a left surround signal for a left rear (surround) loudspeaker and a right surround signal for a right rear (surround) loudspeaker. The encoding must be realized such that decoding by a standard stereo decoder will result in the generation of a compatible stereo signal.

During decoding sometimes noise components became audible. Investigations resulted in the recognition that those noise components became audible because of the matrixing process in the encoder and the corresponding dematrixing process in the decoder. More specifically, the noise components originated from quantisation noise that could not be masked anymore. By selecting another masked threshold to steer (control) the quantisation process, this problem can be solved. More specifically, during encoding an information signal, a choice is made for the masked threshold with which the information signal in question must be data reduced. The choice is made between at least two masked thresholds. For each signal to be data compressed one can say that, one of the at least two masked thresholds is the masked threshold derived from the information signal to be data compressed itself and one of which is the masked threshold derived from another information signal.

In this way, an encoding and subsequent decoding can be realized such that upon decoding the replicas of the original signals as well as the replicas of the compatible signals are devoid of any audible quantisation noise.

DETAILED DESCRIPTION OF THE INVENTION

Figure 1:
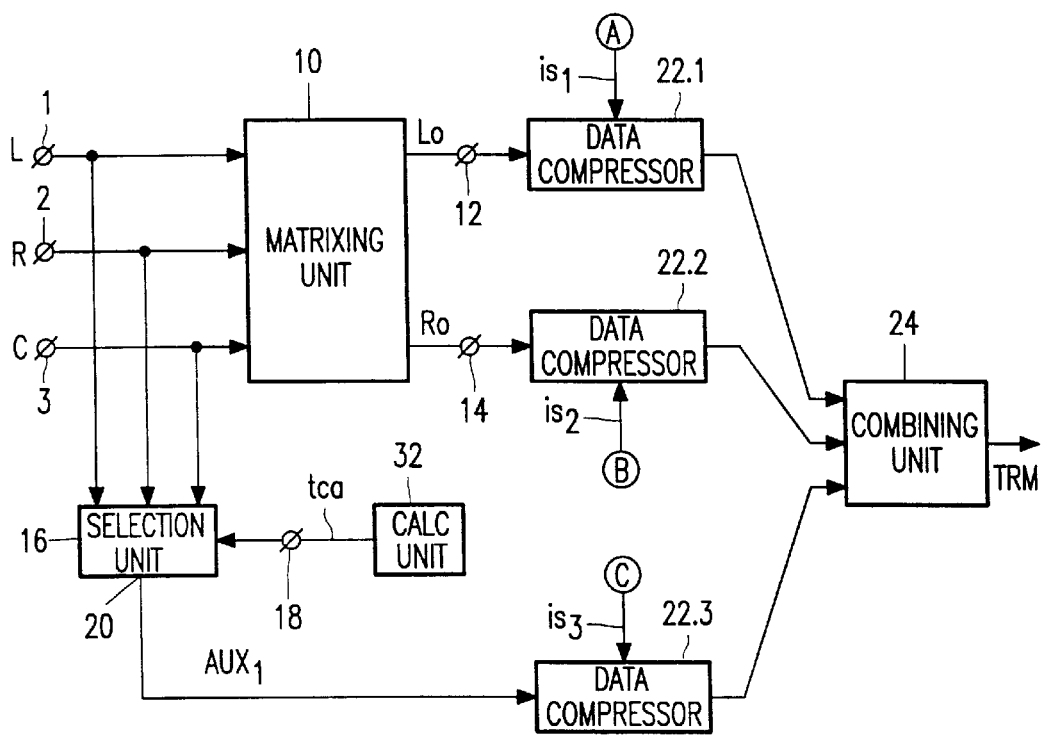
Figure 2:
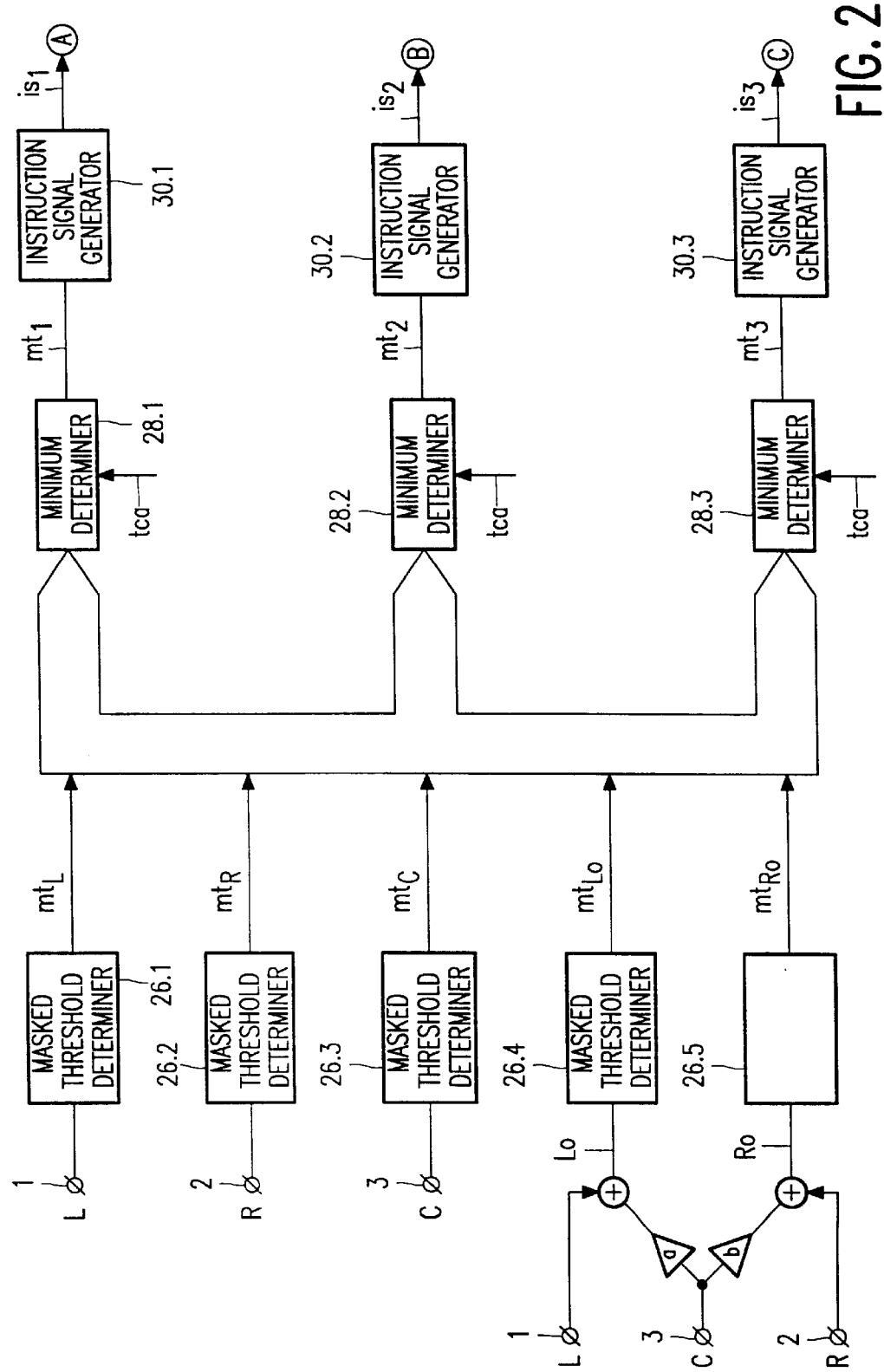
Figure 3:
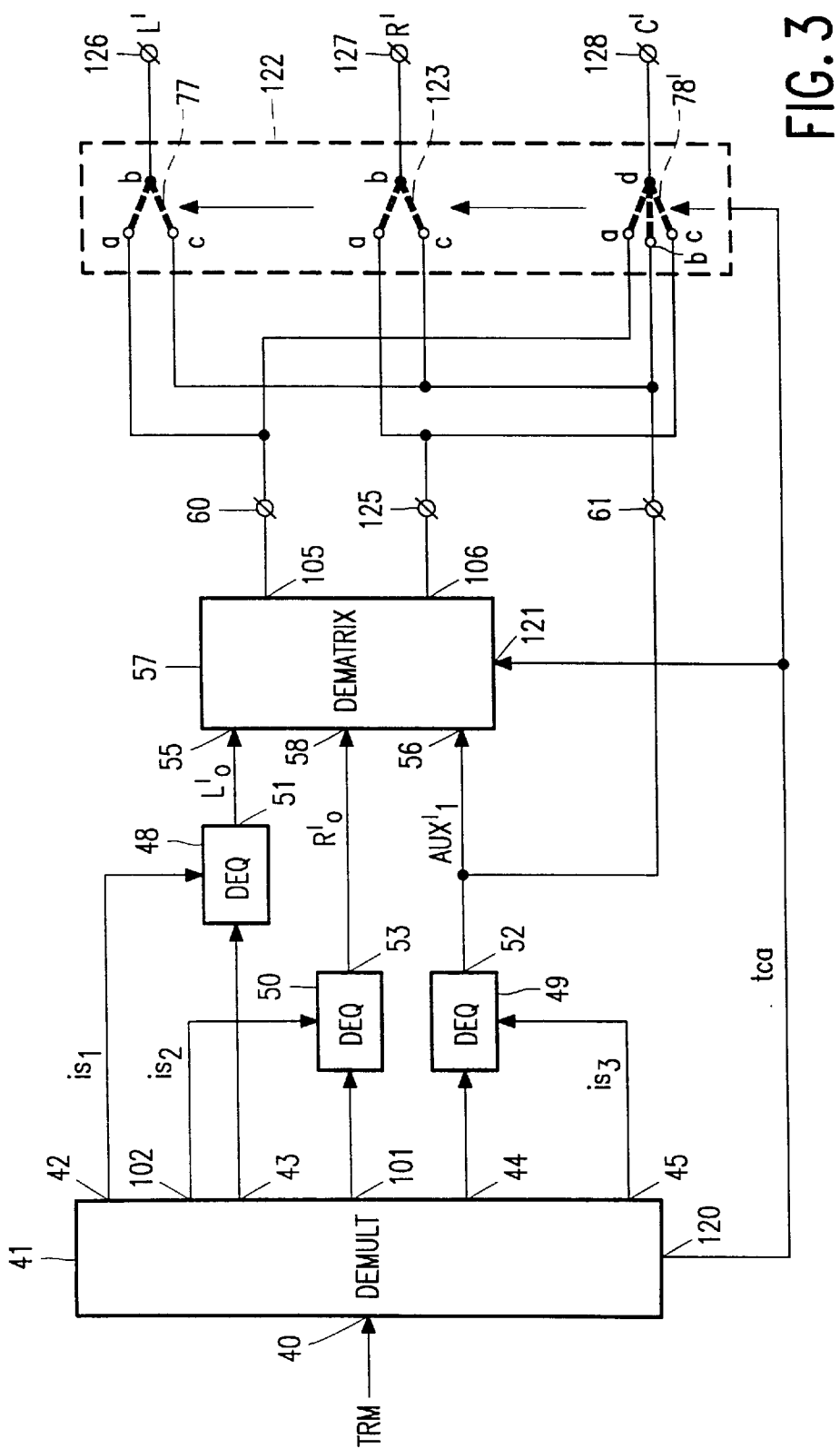
Figure 4:
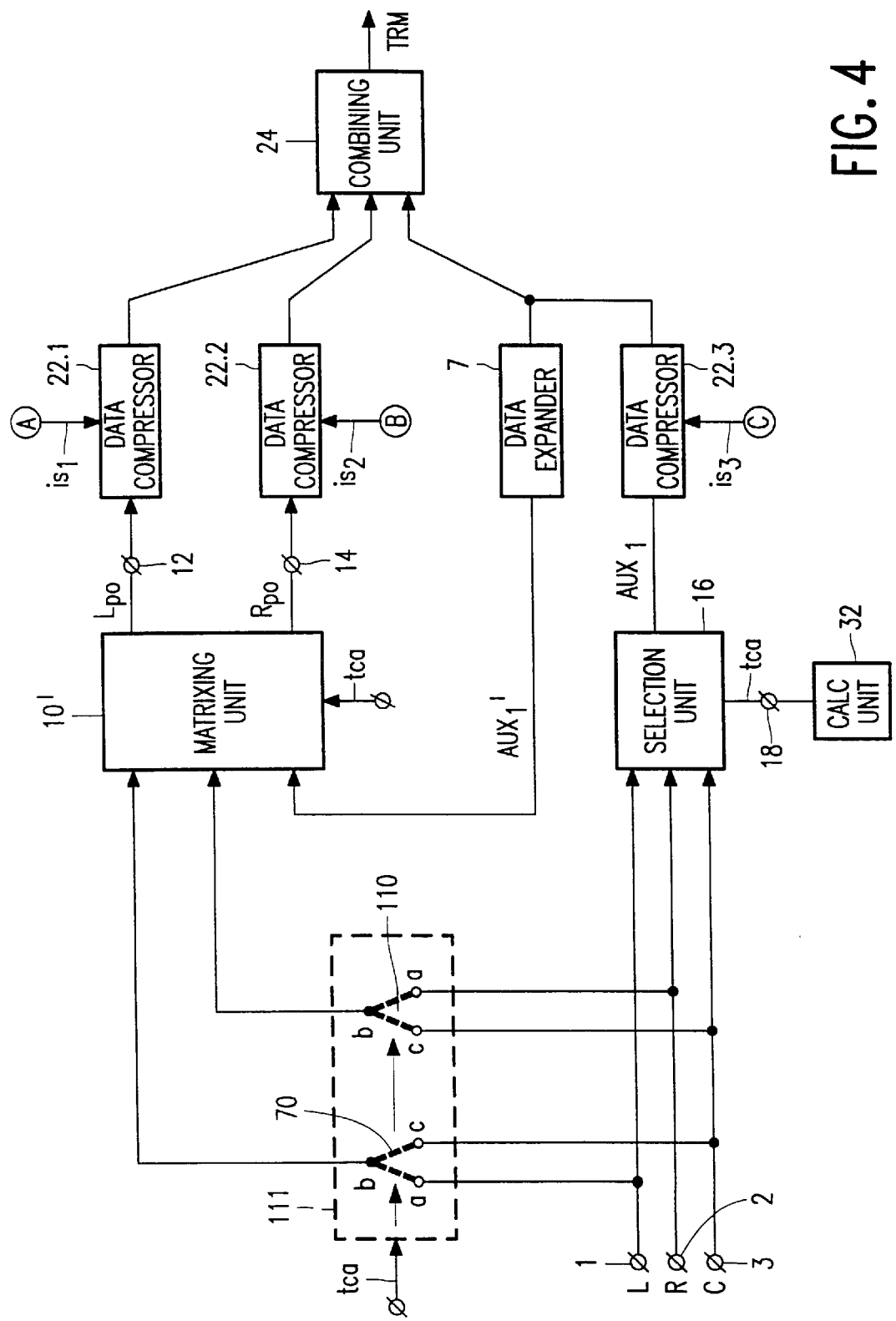
Figure 5:
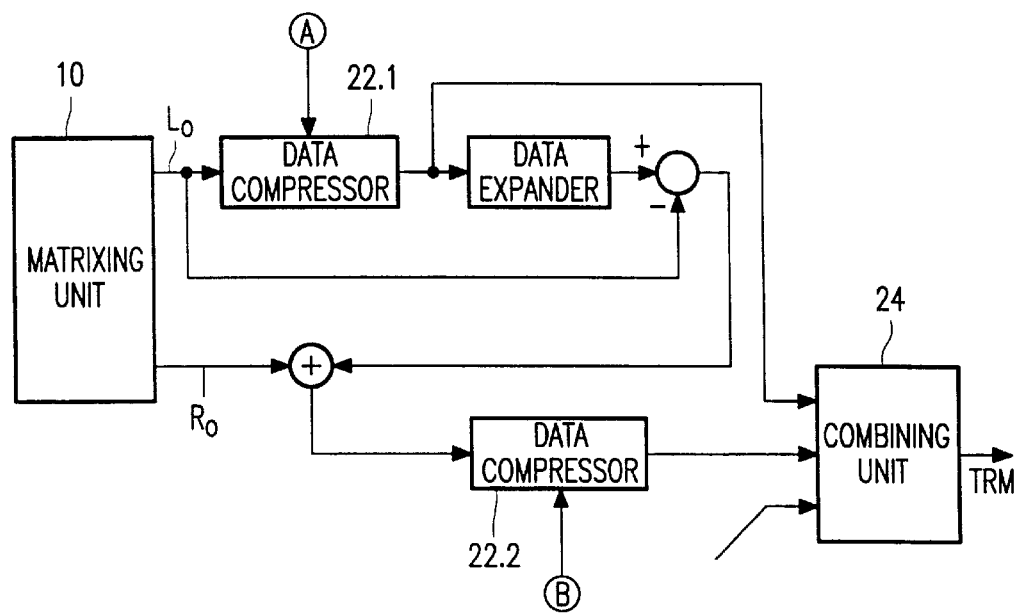
Figure 6:
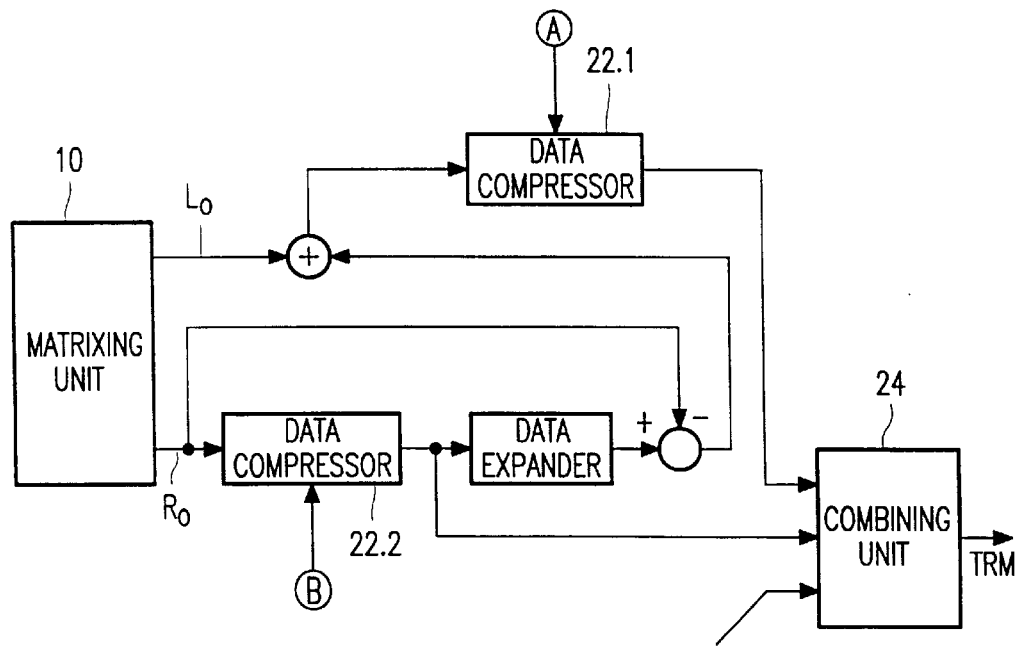
Figure 7:
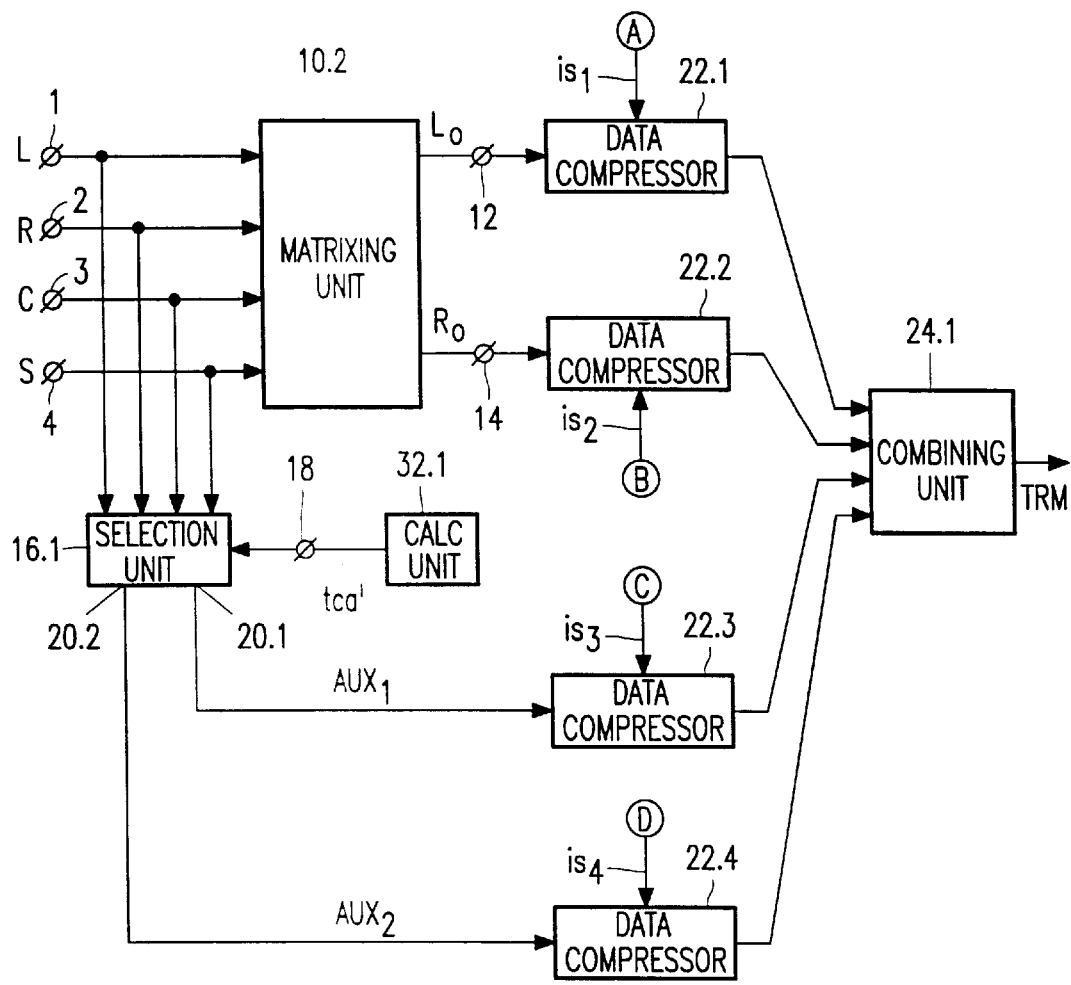
Figure 8:
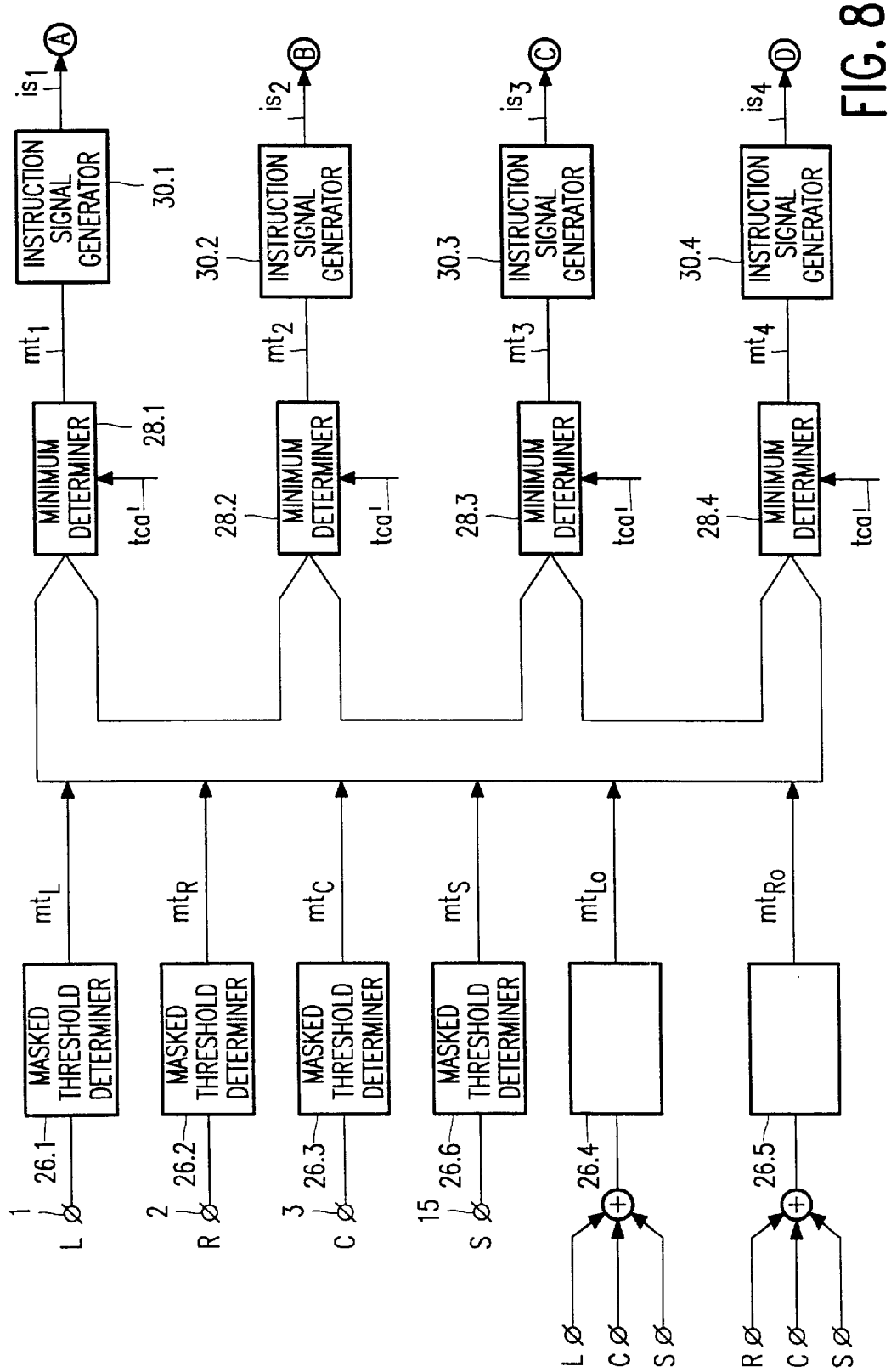
Figure 9:
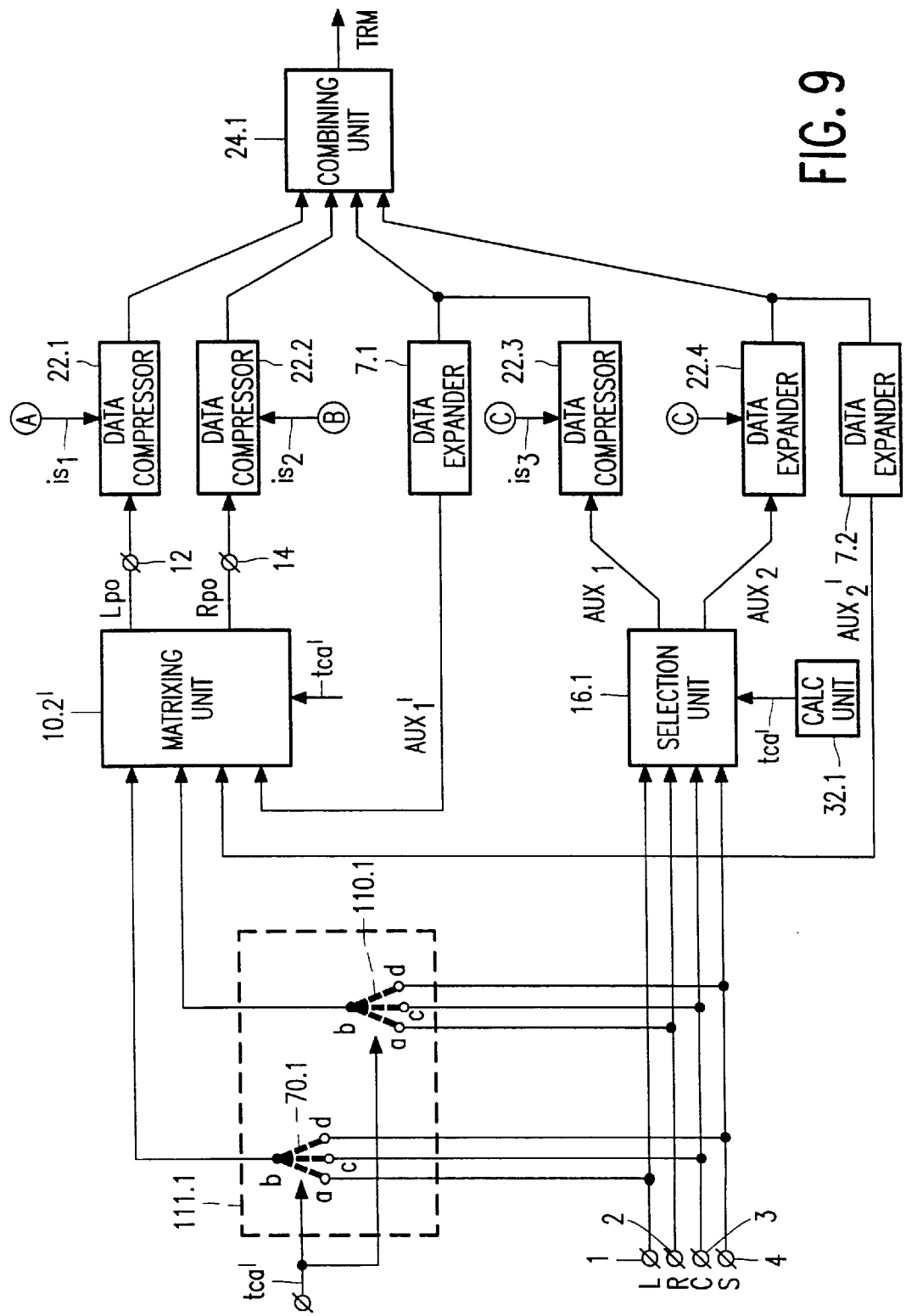
Figure 10:
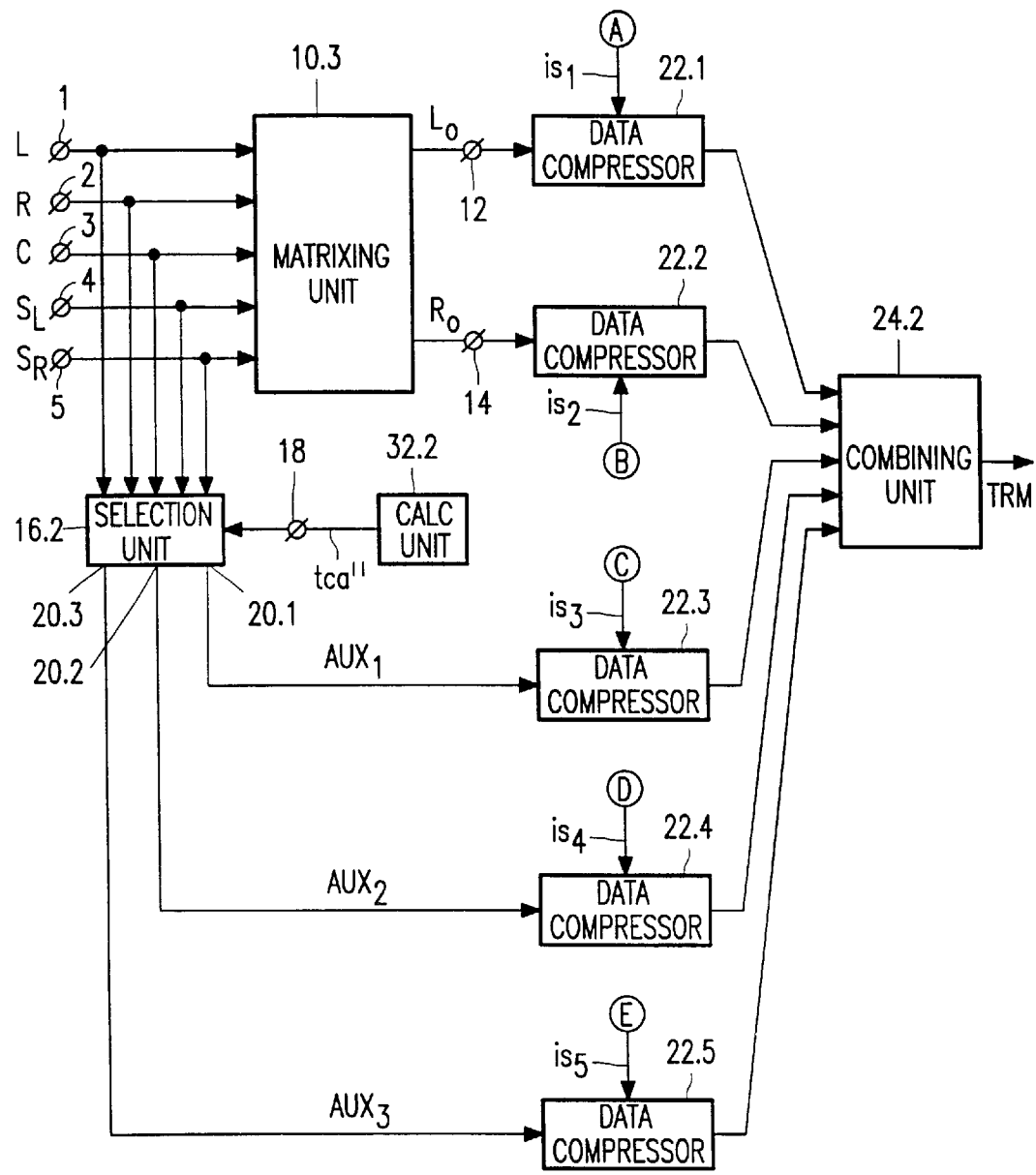
Figure 11:
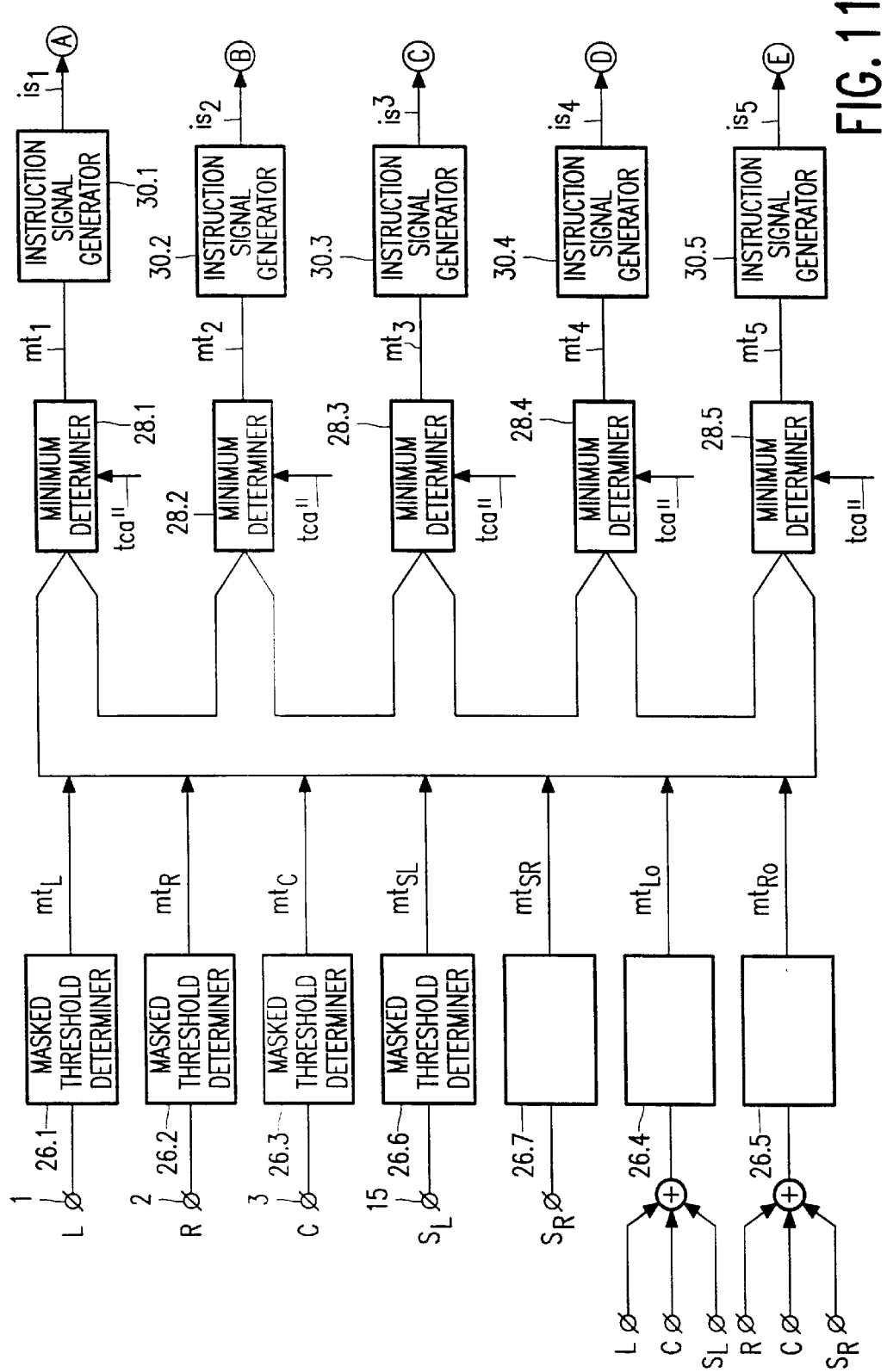
Figure 12:
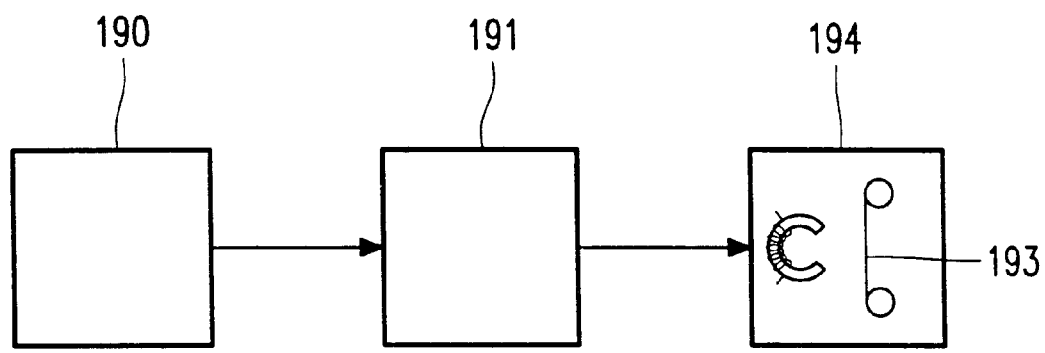

These and other aspects of the invention will be apparent from and elucidated further with reference to the embodiments described in the following figure description, in which FIG. 1 shows a part of a first embodiment of the encoder apparatus in accordance with the invention, for encoding a 3-channel information signal, FIG. 2 shows a further part of the encoder apparatus of FIG. 1, FIG. 3 shows a decoder apparatus for decoding the transmission signal obtained with the encoder apparatus of the FIGS. 1 and 2, FIG. 4 shows a modified version of the encoder apparatus of the FIGS. 1 and 2, FIG. 5 show a another modification to the encoder apparatus of the FIGS. 1 and 2, FIG. 6 shows again another modification of the encoder apparatus of the FIGS. 1 and 2, FIG. 7 shows a part of a second embodiment of the encoder apparatus in accordance with the invention, for encoding a 4-channel information signal, FIG. 8 shows a further part of the encoder apparatus of FIG. 7, FIG. 9 shows another embodiment of the encoder apparatus for encoding a 4-channel information signal, FIG. 10 shows a part of an encoder apparatus for encoding a 5-channel information signal, FIG. 11 shows another part of the encoder apparatus of FIG. 10, and FIG. 12 shows the encoder apparatus included in a recording apparatus.

I. A 3-channel encoder apparatus

The FIGS. 1 and 2 show each a portion of a first embodiment of the encoder apparatus for encoding a 3-channel information signal, such as comprising the left hand signal component (L), the right hand signal component (R) and the centre signal component (C) of a 3-channel audio signal. The encoder apparatus comprises a first input terminal I for receiving the first information signal component (L), a second input terminal 2 for receiving the second information signal component (R) and a third input terminal 3 for receiving the third information signal component C. The three input terminals 1, 2 and 3 are each coupled to a corresponding input of a matrixing unit 10. The matrixing unit has two outputs 12 and 14 for supplying a first composite signal $L_0$ and a second composite signal $R_0$. The composite signals have the following relationship with the signals L, R and C:

$$L_0 = L + a.C \qquad \text{(Eq. 1a)}$$

$$R_0 = R + b.C \qquad \text{(Eq. 1b)}$$

where a and b are constants for which holds that they both are smaller than or equal to 1. Let us assume for the moment that a=b=1.

The input terminals are also coupled to respective inputs of a first selection unit 16. This selection unit 16 selects one of the signals applied to its inputs under the influence of a selection signal applied to the terminal 18 and supplies the selected signal as a first auxiliary signal $AUX_1$ to its output 20. Three data compression units 22.1, 22.2 and 22.3 are provided for carrying out a data compression step on the signals $L_0$, $R_0$ and $AUX_1$ respectively. The data compression units 22.1 and 22.2 have their inputs coupled to the outputs 12 and 14 of the matrixing unit 10 and the data compression unit 22.3 has its input coupled to the output of the selection unit 16. Outputs of the data compression units 22.1, 22.2 and 22.3 are coupled to corresponding inputs of a signal combination unit 24.

The signal combination unit 24 combines the data compressed signals supplied by the data compression units 22.1, 22.2 and 22.3 into a serial datastream. Error correction encoding and channel encoding can be carried out on the serial datastream so as to obtain a transmission signal suitable for transmission via a transmission medium TRM. The transmission medium can be in the form of a record carrier, such as a magnetic or optical record carrier, or any other transmission medium, such as a digital audio broadcast channel (DAB).

Document (5) in the list of related documents describes one way of channel encoding the serial datastream so as to obtain the transmission signal. Preferably, the transmission signal is in accordance with the ISO/IEC standards given in documents (9) and (10).

Prior art publications describe the way in which a data compression step can be carried out on a signal applied to a data compression unit, such as the units 22.1, 22.2 and 22.3. One such data compression technique is the subband coding data compression technique, as applied in MPEG-1, MPEG-2 and DAB. Documents describing the subband coding data compression technique are the documents (3), (4), (6), (7a), (7b), (9) and (10). In this data compression technique, signal components below a masked threshold are left out, as one way of realizing the data compression. The data compression in the data compression units 22.1, 22.2 and 22.3 is realized in response to instruction signals $is_1$, $is_2$ and $is_3$ respectively, as shown in FIG. 1. Those instruction signals have been derived from masked thresholds to be discussed hereafter.

The apparatus further comprises five masked threshold determining units, denoted 26.1 to 26.5. The masked threshold determining unit 26.1 receives the first information signal L and derives a masked threshold therefrom and supplies the masked threshold as a first masked threshold $mt_L$ to its output. The masked threshold determining unit 26.2 receives the second information signal R and derives a masked threshold therefrom and supplies the masked threshold as a second masked threshold $mt_R$ to its output. The masked threshold determining unit 26.3 receives the third information signal C and derives a masked threshold therefrom and supplies the masked threshold as a third masked threshold $mt_C$ to its output. The masked threshold determining unit 26.4 receives the first composite signal $L_0$ and derives a masked threshold therefrom and supplies the masked threshold as a fourth masked threshold $mt_{L0}$ to its output. The masked threshold determining unit 26.5 receives the second composite signal $R_0$ and derives a masked threshold therefrom and supplies the masked threshold as a fifth masked threshold $mt_{R0}$ to its output.

One additional remark should be made here, as regards the derivation of the masked thresholds $mt_{L0}$ and $mt_{R0}$ in the units 26.4 and 26.5 respectively. As can be seen in FIG. 2, the input signals for the masked threshold determining units 26.4 and 26.5 have not been derived from the outputs 12 and 14 respectively of the matrixing unit 10, but by separately combining L and C so as to derive $L_0$ and R and C so as to derive $R_0$. In the embodiment later described with situation 1a one could have coupled the inputs of the units 26.4 and 26.5 directly to the outputs 12 and 14 respectively of the matrixing unit 10. In another embodiment, later described with situation 1b, where prequantisation and subsequent dequantisation is carried out on the auxiliary signal $aux_1$ prior to matrixing, the masked thresholds $mt_{L0}$ and $mt_{R0}$ should be derived from the original versions of L, R and C and not from the prequantised and subsequently dequantised version of one of such signals.

The apparatus further comprises three selection units 28.1, 28.2 and 28.3. The selection unit 28.1 receives a plurality of masked thresholds to its inputs and derives a first selected masked threshold $mt_1$ therefrom. Preferably, the selection unit 28.1 selects one of those plurality of masked thresholds as the first selected masked threshold $mt_1$ and supplies this first selected masked threshold $mt_1$ to its output. The selection unit 28.2 receives a plurality of masked thresholds to its inputs and derives a second selected masked threshold $mt_2$ therefrom. Preferably, the selection unit 28.2 selects one of those plurality of masked thresholds as the second selected masked threshold $mt_2$ and supplies this second selected masked threshold $mt_2$ to its output. The selection unit 28.3 receives a plurality of masked thresholds to its inputs and derives a third selected masked threshold $mt_3$ therefrom. Preferably, the selection unit 28.3 selects one of those plurality of masked thresholds as the third selected masked threshold $mt_3$ and supplies this third selected masked threshold $mt_3$ to its output.

Outputs of the selection units 28.1, 28.2 and 28.3 are coupled to a corresponding input of respective instruction signal generator units 30.1, 30.2 and 30.3. Each instruction signal generator unit 30.*i* (where i runs from 1 to 3) generates an instruction signal in response to a selected masked threshold supplied to its input. More specifically, the instruction signal generator unit 30.1 calculates a signal-to-mask ratio between the signal $L_0$ and the masked threshold supplied by the selection unit 28.1 and subsequently derives bitallocation information therefrom, in a way well known in the prior art. This bit allocation information is used to quantize the signal $L_0$ in the data compression unit 22.1. In the same way, the instruction signal generator unit 30.2 calculates a signal-to-mask ratio between the signal $R_0$ and the masked threshold supplied by the selection unit 28.2 and subsequently derives bitallocation information therefrom. This bit allocation information is used to quantize the signal $R_0$ in the data compression unit 22.2. In the same way, the instruction signal generator unit 30.3 calculates a signal-to-mask ratio between the signal $AUX_1$ and the masked threshold supplied by the selection unit 28.3 and subsequently derives bitallocation information therefrom. This bit allocation information is used to quantize the signal $AUX_1$ in the data compression unit 22.3.

The selection made in the selection unit 16, of which of the three input signals will become the auxiliary signal, is based on the amount of data compression that can be obtained. This has been described in various earlier documents, such as the documents (2) and (8). One way of selecting the first auxiliary signal is based on the following requirement. That one signal of the three signals L, R and C is chosen as the auxiliary signal $AUX_1$ that results in the highest data compression ratio to be achieved in the data compression units 22.1, 22.2 and 22.3. It will be clear that the apparatus thus comprise a calculation unit 32 that generates, in accordance with the above requirement, the selection control signal tca for the selection unit 16.

Before describing the derivation of the masked thresholds in the selection units 28.1, 28.2 and 28.3, a decoder apparatus for decoding the 3-channel information signal will be described.

FIG. 3 shows a decoder for receiving and decoding the compressed signals transmitted by the transmitter of the FIGS. 1 and 2 via the transmission medium TRM. This description can also be found in document (8) of the list of related documents.

The serial datastream is applied to an input 40 of a demultiplexer 41, which splits the information in the serial datastream into the original quantized samples of the signal $L_0$, which samples are applied to an output 43, the original quantized samples of the signal $R_0$, which samples are applied to an output 101, the original quantized samples of the first auxiliary signal $AUX_1$ transmitted, which is either the quantized L-, R- or C-signal, which samples are applied to an output 44. The first, second and third instruction signals $is_1$, $is_2$ and $is_3$ are transmitted as well and thus retrieved from the serial datastream by the demultiplexer unit 41. The first instruction signal $is_1$ is applied to an output 42, the second instruction signal $is_2$ is applied to an output 102 and the third instruction signal $is_3$ is applied to an output 45. The outputs 43, 44 and 101 are coupled to signal inputs of data expansion units (dequantizers DEQ) 48, 49 and 50 respectively. The outputs 42, 45 and 102 are coupled to control signal inputs of the quantizers 48, 49 and 50 respectively, so as to enable the instruction signals to be applied to the dequantizers. The dequantizer 48 generates a replica $L_0'$ of the signal $L_0$, which is supplied to an output 51. The dequantizer 50 generates the replica $R_0'$ of the signal component $R_0$, which is supplied to an output 53. The dequantizer 49 generates a replica $AUX_1'$ of the quantized first auxiliary signal $AUX_1$ which is applied to the output 52. The outputs 51, 52 and 53 are coupled to inputs 55, 56 and 58 respectively of a dematrixing unit 57.

The demultiplexer means 41 has an additional output 120 for supplying a control signal equivalent to the tca control described with reference to FIG. 1. The dematrixing unit 57 has an additional control signal input 121 which is coupled to the output 120 of the demultiplexer means 41. If the control signal tca applied to the control signal input 121 has a first value, this means that the signal applied to the input 56 of the dematrixing unit 57 is the replica of the C-signal. In that case, the dematrixing unit 57 functions so that replicas of the L- and R-signals are applied to outputs 105 and 106 respectively, and thus to terminals 60 and 125 respectively. If the control signal tca applied to the control signal input 121 has a second value, this means that the signal applied to the input 56 of the dematrixing unit 57 is the replica of the L-signal. In that case, the dematrixing means 57 functions such that replicas of the C- and R-signals are applied to the outputs 105 and 106 respectively, and thus to the terminals 60 and 125 respectively. If the control signal tca applied to the control signal input 121 has a third value, this means that the signal applied to the input 56 of the dematrixing unit 57 is the replica of the R-signal. In that case, the dematrixing unit 57 functions such that replicas of the L- and C-signals are applied to the terminals 60 and 125 respectively.

The receiver further comprises a controllable switching unit 122 comprising switches 77, 123 and 78'. In response to a tca control signal of the first value applied to the switching means 122, the switch 77 is switched in the position a-b, the switch 123 is switched in the position a-b and the switch 78' is switched in the position b-d, so that the replicas L', R' and C' are applied to the terminals 126, 127 and 128 respectively. In response to the tca control signal of the second value applied to the switching means 122, the switch 77 is switched in the position c-b, the switch 123 is switched in the position a-b and the switch 78' is switched in the position a-d, so that the replicas L', R' and C' are again applied to the terminals 126, 127 and 128 respectively. In response to the tca control signal of the third value applied to the switching means 122, the switch 77 is switched in the position a-b, the switch 123 is switched in the position c-b and the switch 78' is switched in the position c-d, so that the replicas L', R' and C' are again applied to the terminals 126, 127 and 128 respectively.

The 3-channel information signal has been encoded in such a way into a transmission signal in the encoding apparatus of the FIGS. 1 and 2, that it is backwards compatible. That means that prior art stereo decoders are also capable to decode the transmission signal into a 2-channel stereo audio signal. Those decoders solely retrieve the first and second data compressed composite signals $L_0$ and $R_0$ from the transmission signal, data expands them into the replicas $L_0'$ and $R_0'$ and supplies them to two loudspeakers positioned in a stereo setup in a room.

The replicas $L_0'$ and $R_0'$ satisfy the following equations:

$$L_0'=L_0+N_{L0} \quad \text{(Eq.2a)}$$

$$R_0'=R_0+N_{R0} \quad \text{(Eq.2b)}$$

where $N_{L0}$ is the quantisation noise introduced by data compressing the signal $L_0$ using the instruction signal is$_1$ derived from the masked threshold mt$_1$ and $N_{R0}$ is the quantisation noise introduced by data compressing the signal $R_0$ using the instruction signal is$_2$ derived from the masked threshold mt$_2$. The noise component $N_{L0}$ is masked by the signal $L_0$ and the noise component $N_{R0}$ is masked by the signal $R_0$, so that the quantisation noise in the signals $L_0'$ and $R_0'$ are unaudible.

Now, let us look at how the signals L, R and C are retrieved. It is assumed that aux$_1$=C, or tca=0. Thus:

$$C'=aux_1'=C+N_C.$$

$N_C$ is the quantisation noise introduced by data compressing the signal C using the instruction signal is$_3$, which is derived from the masked threshold mt$_3$. The noise component $N_C$ is masked by the signal C, so that the quantisation noise in the signal C' is inaudible.

The signals L and R are retrieved as:

$$L'=L_0'-C'=L+N_{L0}-N_C$$

$$R'=R_0'-C'=R+N_{R0}-N_C.$$

The signal part in $L_0$ which corresponds to C is removed. However, because in general $N_{L0}$ and $N_C$ are uncorrelated, the part in $N_{L0}$ which corresponds to $N_C$ remains and in fact might double in level. As a consequence, that part ($N_C$) might become audible in L'. The same reasoning is valid for the behaviour of $N_C$ in R'.

In order to overcome this, the selection units 28.1, 28.2 and 28.3 are provided in the encoder apparatus.

The selection of the masked thresholds will now be described in full detail. It should be noted here already that the group of masked thresholds from which one masked threshold should be selected in a selection unit 28.i can be different in the various situations that can occur. Amongst others, the group of masked thresholds depends on which of the three signals has been chosen as the auxiliary signal AUX$_1$.

Ia

Table 1 below shows the three situations indicated by the three tca values tca=0, tca=1 and tca=2, and indicating the choice for the auxiliary signal AUX$_1$, which is the signal C, L and R respectively. When C is selected as the auxiliary signal, the signals L and R are denoted as first and second main signals $M_1$ and $M_2$ respectively. When L is selected as the auxiliary signal, the signals C and R are denoted as first and second main signals $M_1$ and $M_2$ respectively. When R is selected as the auxiliary signal, the signals L and C are denoted as first and second main signals $M_1$ and $M_2$ respectively.

TABLE 1

| tca | $M_1$ | $M_2$ | AUX$_1$ |
|---|---|---|---|
| 0 | L | R | C |
| 1 | C | R | L |
| 2 | L | C | R |

Suppose first that the calculation unit 32 has established that the signal C should be selected as the auxiliary signal AUX$_1$. Thus tca=0.

The selection unit 28.1 will now select the smallest masked threshold from a group of two masked thresholds, which are: mt$_{L0}$ and mt$_L$. The selection unit 28.2 will now select the smallest masked threshold from a group of two masked thresholds, which are: mt$_{R0}$ and mt$_R$.

The selection unit 28.3 selects the smallest masked threshold from a group of three masked thresholds, which are: mt$_L$, mt$_R$ and mt$_C$.

As the smallest of the masked thresholds mt$_{L0}$ and mt$_L$ is chosen for data compressing $L_0$, this means that no quantisation noise is audible in the regenerated signal $L_0'$ upon decoding. In the same way, as the smallest of the masked thresholds mt$_{R0}$ and mt$_R$ is chosen for data compressing $R_0$, this means that no quantisation noise is audible in the regenerated $R_0'$ upon decoding. Also in the same way, as the smallest of the masked thresholds mt$_C$, mt$_L$ and mt$_R$ is chosen for data compressing C, this means that no quantisation noise is audible in the regenerated C' upon decoding.

As said above, $L'=L_0'-C'=L+N_{L0}-N_C$. $N_{L0}$ is masked by the masked threshold mt$_1$, which is the minimum of the masked thresholds mt$_{L0}$ and mt$_L$. As a consequence, $N_{L0}$ is also masked by the signal L. $N_C$ is masked by the masked threshold mt$_3$, which is the minimum of the masked thresholds mt$_C$, mt$_R$ and mt$_L$. As a consequence, $N_C$ is also masked by the signal L.

An equivalent reasoning applies to the signal R'. As a consequence, all the signals that are regenerated in the decoder are free of quantisation noise.

Suppose now that tca=1. The selection unit 28.1 will now select the smallest masked threshold from a group of three masked thresholds, which are now: mt$_{L0}$, mt$_R$ and mt$_C$. The selection unit 28.2 will now select the smallest masked threshold from a group of two masked thresholds, which are again: mt$_{R0}$ and mt$_R$.

The selection unit 28.3 selects the smallest masked threshold from a group of three masked thresholds, which are: mt$_L$, mt$_R$ and mt$_C$.

The quantisation noise in $L_0$ and $R_0$ is inaudible, for the same reasoning as given above for tca=0. For the signal aux$_1$ now holds the equation: aux$_1$=L'=L+N$_L$. $N_L$ is masked by the masked threshold mt$_3$, which is the minimum of mt$_L$, mt$_C$ and mt$_R$. As a consequence, $N_L$ is inaudible, as it is masked by mt$_L$.

For the regenerated signal C', the following equation holds:

$$C'=L_0'-L'=C+N_{L0}-N_L.$$

$N_{L0}$ is masked by mt$_1$, which is the minimum of the masked thresholds mt$_{L0}$, mt$_R$ and mt$_C$. Thus $N_{L0}$ is also masked by C. $N_L$ is masked by mt$_3$, which is the minimum of the masked thresholds mt$_L$, mt$_C$ and mt$_R$. Thus $N_L$ is also masked by C. As a consequence, C' is free from audible quantisation noise.

For the regenerated signal R', the following equation holds:

$$R'=R_0'-C'=R+N_{R0}-N_{L0}+N_L.$$

$N_{R0}$ is masked by $mt_2$, which is the minimum of the masked thresholds $mt_{R0}$ and $mt_R$. Thus $N_{R0}$ is also masked by R. $N_{L0}$ is masked by $mt_1$, which is the minimum of the masked thresholds $mt_{L0}$, $mt_C$ and $mt_R$. Thus $N_{L0}$ is also masked by R. $N_L$ is masked by $mt_3$, which is the minimum of the masked thresholds $mt_L$, $mt_C$ and $mt_R$. Thus $N_L$ is also masked by R. As a consequence, R' is free from audible quantisation noise.

Suppose now that tca=2. The selection unit 28.1 will now select the smallest masked threshold from a group of two masked thresholds, which are again: $mt_{L0}$ and $mt_L$. The selection unit 28.2 will now select the smallest masked threshold from a group of two masked thresholds, which are now: $mt_{R0}$, $mt_L$ and $mt_C$.

The selection unit 28.3 selects the smallest masked threshold from a group of three masked thresholds, which are now: $mt_L$, $mt_R$ and $mt_C$.

From an explanation that all the signals are free from audible quantisation noise, will be refrained, for the following reason. The situation tca=2 can be obtained from the situation tca=1, when interchanging R and L, $L_0$ and $R_0$ and $mt_1$ and $mt_2$. Therefore, an equivalent reasoning as given above for tca=1 is valid for tca=2, to prove that the regenerated signals are all free from audible quantisation noise.

Ib

In the foregoing, it has been assumed that no prequantisation and subsequent dequantisation has taken place on the first auxiliary signal $AUX_1$ prior to matrixing. Prequantisation and subsequent dequantisation on an auxiliary signal prior to matrixing has been described in various prior art documents and can result in a large saving in bitneed. Reference is made in this respect to the documents (2) and (8) in the list of related documents.

More specifically, FIG. 4 discloses schematically an embodiment of the encoder apparatus embodying such prequantisation and subsequent dequantisation on the auxiliary signal $AUX_1$, prior to matrixing. As can be seen in FIG. 4, the encoder apparatus further comprises a data expansion unit 7 having an input coupled to the output of the data compression unit 22.3, in which the data compressed auxiliary signal $AUX_1$ is expanded so as to obtain a replica $AUX_1'$ of the auxiliary signal. Further, a switching unit 111 is required to provide the matrixing unit 10' with all the signals needed for carrying out the matrixing step. The switching unit 111 comprises switches 70 and 110 controlled by the tca control signal. Further, the matrixing unit 10' now requires the reception of the control signal tca.

For tca=0, both switches 70 and 110 are in their position a-b. For tca=1, the switch 70 is in its position b-c and the switch 110 is in its position a-b. For tca=3, the switch 70 is in its position a-b and the switch 110 is in its position b-c. The matrixing unit 10' now generates composite signals, designated $L_{p0}$ and $R_{p0}$, which indicate that the composite signals comprise a component of the auxiliary signal that is quantised and subsequently dequantised. Further, as has been said above, the masked thresholds $mt_{L0}$ and $mt_{R0}$ given in FIG. 2 will be derived from the original signals. So, not the quantised and subsequently prequantised version of the signal selected as the auxiliary signal is used for obtaining the masked thresholds $mt_{L0}$ and $mt_{R0}$.

For the embodiment of the encoder apparatus of FIG. 4, some of the selections described above will change.

More specifically, for tca=0, the selections in the selection units 28.1 and 28.2 remain the same as described above for the situation Ia and tca=0. The selection unit 28.3, however, now selects the smallest masked threshold from a group of three masked thresholds, which are: $mt_{L0}$, $mt_{R0}$ and $mt_C$.

Again, it will be shown that replicas of all signals that can be regenerated in a decoder will be free of audible quantisation noise.

The regenerated replica of the signal $L_{p0}$, which is indicated $L_{p0}'$ satisfies the following equation: $L_{p0}'=L_{p0}+N_{L0}$, where the quantisation noise component $N_{L0}$ comes from the quantisation of $L_{p0}$ in data compression unit 22.1 and the subsequent expansion in the data expander 48, see FIG. 3. Further, $L_{p0}$ satisfies the equation: $L_{p0}=L+C+N_C$, where the quantisation noise component $N_C$ comes from the quantisation of the signal C in the data compression unit 22.3 and the subsequent data expansion in data expander 7, see FIG. 4. Thus $L_{p0}'=L+C+N_C+N_{L0}$, or $L_{p0}'=L_0+N_C+N_{L0}$.

$N_{L0}$ stems from $mt_1$, which is the minimum of $mt_{L0}$ and $mt_L$. Thus, $N_{L0}$ is thus masked by $L_0$. $N_C$ stems from $mt_3$, which is the minimum of $mt_C$, $mt_{L0}$ and $mt_{R0}$. Thus, $N_C$ is also masked by $L_0$. Or, $L_{p0}'$ is free from audible quantisation noise. An equivalent reasoning can be held for $R_{p0}'$.

The replica C' equals $C+N_C$. As said above, $N_C$ stems from $mt_3$, which is the minimum of $mt_C$, $mt_{L0}$ and $mt_{R0}$. Thus, NC is masked by C and C is thus free from audible quantisation noise.

The replica L' satisfies the following equation: $L'=L_{p0}'-C'$, which is equal to: $L'=L+N_{L0}$. As said above, $N_{L0}$ stems from $mt_1$, which is the minimum of $mt_{L0}$ and mt. Thus, $N_{L0}$ is masked by L, as well, and L' is free from audible quantisation noise.

For tca=1, the selections in the selection units 28.1 and 28.2 again remain the same as described above for the situation Ia and tca=1. The selection unit 28.3, however, now selects the smallest masked threshold from a group of two masked thresholds, which are: $mt_L$ and $mt_{L0}$.

No further explanation will be given. But, it will be clear that, using an equivalent reasoning as given above is possible, showing that all regenerated signals are free from audible quantisation noise.

For tca=2, the selections in the selection units 28.1 and 28.2 again remain the same as described above for the situation Ia and tca=2. The selection unit 28.3, however, now selects the smallest masked threshold from a group of two masked thresholds, which are: $mt_R$ and $mt_{R0}$.

Ic

A further variation in the case of tca=0, is to derive the two composite signals in the following way in the matrixing unit 10:

$$L_{p0}=L+C_{pd} \quad \text{(Eq.3a)}$$
$$R_0=R+C \quad \text{(Eq. 3b)}$$

This means that $L_{p0}$ is derived from $C_{pd}$, which is a prequantised and subsequently dequantised version of C, whereas $R_0$ is derived from the original signal C.

For tca=0, the selections in the selection units 28.1 and 28.2 again remain the same as described above for the situation Ia and tca=0. The selection unit 28.3, however, now selects the smallest masked threshold from a group of three masked thresholds, which are: $mt_{L0}$, $mt_R$ and $mt_C$.

Id

Again another variation in the case of tca=0, is to derive the composite signals in the following way in the matrixing unit 10:

$$L_0 = L + C \quad \text{(Eq. 4a)}$$

$$R_{p0}R + C_{pd} \quad \text{(Eq. 4b)}$$

This means that $R_{p0}$ is derived from $C_{pd}$, which is the prequantised and subsequently dequantised version of C, whereas $L_0$ is derived from the original signal C.

For tca=0, the selections in the selection units 28.1 and 28.2 again remain the same as described above for the situation Ia and tca=0. The selection unit 28.3, however, now selects the smallest masked threshold from a group of three masked thresholds, which are: $mt_L$, $mt_{R0}$ and $mt_C$.

Ie

When tca=1 is chosen, it is known from a prior art document, document (8) in the list of related documents, to carry out a compensation on the second composite signal $R_0$. This is shown in FIG. 5. Also, reference is made in this respect to FIG. 11 and the corresponding description in the document (8).

In this situation, the selection unit 28.1 will now select the smallest masked threshold from a group of three masked thresholds, which are now: $mt_{L0}$, $mt_{R0}$ and $mt_C$.

If

When tca=2 is chosen, it is known from a prior art document, document (8) in the list of related documents, to carry out a compensation on the first composite signal $L_0$. This is shown in FIG. 6. Also, reference is made in this respect to FIG. 12 and the corresponding description in the document (8).

In this situation, the selection unit 28.2 will now select the smallest masked threshold from a group of three masked thresholds, which are now: $mt_{L0}$, $mt_{R0}$ and $mt_C$.

Table 2 comprises all selections of the masked thresholds in the three selection units 28.1, 28.2 and 28.3 for the situations described above.

TABLE 2

| situation | tca | 28.1 | 28.2 | 28.3 |
|---|---|---|---|---|
| Ia | 0 | $mt_{L0},mt_L$ | $mt_{R0},mt_R$ | $mt_L,mt_R,mt_C$ |
|  | 1 | $mt_{L0},mt_C,mt_R$ | $mt_{R0},mt_R$ | $mt_L,mt_R,mt_C$ |
|  | 2 | $mt_{L0},mt_L$ | $mt_{R0},mt_C,mt_L$ | $mt_L,mt_R,mt_C$ |
| Ib | 0 |  |  | $mt_{L0},mt_{R0},mt_C$ |
|  | 1 |  |  | $mt_L,mt_{L0}$ |
|  | 2 |  |  | $mt_R,mt_{R0}$ |
| Ic | 0 |  |  | $mt_{L0},mt_R,mt_C$ |
| Id | 0 |  |  | $mt_L,mt_{R0},mt_C$ |
| Ie | 1 | $mt_{L0},mt_{R0},mt_C$ |  |  |
| If | 2 |  | $mt_{L0},mt_{R0},mt_C$ |  |

It should be noted here that the masked thresholds in the positions not filled in in the table 2 for the situations Ib to If are identical to the masked thresholds filled in in the corresponding positions in the situation Ia. Further, when combining the situations Ib and Ie (or the situations Ib and If), the selections given under Ie (If) should replace the selections given in Ib.

From table 2 it is clear that the selection unit 28.1 requires at least the masked thresholds $mt_L$ and $mt_{L0}$ for the selection. Further, in the situation Ia and tca=1, also $mt_C$ and $mt_R$ are required for carrying out the selection. Moreover, if the apparatus is also provided with the circuit shown in FIG. 5, that is the situation Ie and tca=1, in addition $mt_{R0}$ is required for carrying out the selection. FIG. 2 therefore shows schematically a connection between the outputs of the masked threshold determining units 26.1 to 26.5 and the selection unit 28.1. Dependent of the embodiment of the encoder apparatus discussed, that is: dependent of the situation given in the table, the masked thresholds given in the table will be supplied to the selection unit 28.1.

It is further clear from the table 2 that the selection unit 28.2 requires at least the masked thresholds $mt_R$ and $mt_{R0}$ for carrying out a selection. Further, in the situation Ia and tca=2, also $mt_L$ and $mt_C$ for carrying out the selection. Moreover, if the apparatus is provided with the circuit shown in FIG. 6, that is the situation If and tca=2, in addition the masked threshold $mt_{L0}$ is required. FIG. 2 therefore shows schematically a connection between the outputs of the masked threshold determining units 26.1 to 26.5 and the selection unit 28.2. Dependent of the embodiment of the encoder apparatus discussed, that is: dependent of the situation given in the table, the masked thresholds given in the table will be supplied to the selection unit 28.2.

In the same way, FIG. 2 shows schematically a connection between the outputs of the masked threshold determining units 26.1 to 26.5 and the selection unit 28.3. Dependent of the embodiment of the encoder apparatus discussed, that is: dependent of the situation given in the table, the masked thresholds given in the table will be supplied to the selection unit 28.3.

II. A 4-channel encoder apparatus

The FIGS. 7 and 8 show an embodiment of a encoder apparatus for encoding a 4-channel information signal, such as a 4-channel audio signal comprising the left hand signal component (L), the right hand signal component (R), the centre signal component (C) and a surround signal component (S). The encoder apparatus shows large resemblances with the encoder apparatus of the FIGS. 1 and 2. Apart from the elements already discussed with reference to the FIGS. 1 and 2, the embodiment of the FIGS. 7 and 8 comprise a fourth input terminal 4 for receiving a fourth information signal in the form of the surround signal S. The input terminal 4 is coupled to a corresponding input of the matrixing unit 10.2. The matrixing unit 10.2 has two outputs 12 and 14 for supplying a first composite signal $L_0$ and a second composite signal $R_0$. The composite signals have the following relationship with the signals L, R, C and S:

$$L_0 = L + a.C + d.S \quad \text{(Eq. 5a)}$$

$$R_0 = R + b.C + f.S \quad \text{(Eq. 5b)}$$

where a, b, d and f are constants for which holds that they all are smaller than or equal to 1. Let us assume for the moment that a=b=d=f=1.

The input terminal 4 is also coupled to a corresponding input of the first selection unit 16.1. This selection unit 16.1 selects two of the signals applied to its four inputs under the influence of a selection signal tca' applied to the terminal 18 and supplies the selected signals as first and second auxiliary signals $AUX_1$ and $AUX_2$ respectively, to its outputs 20.1 and 20.2 respectively. A fourth data compression unit 22.4 is provided for carrying out a data compression step on the signals $AUX_2$. The data compression unit 22.3 has its input coupled to the output 20.1 of the selection unit 16.1 and the data compression unit 22.4 has its input coupled to the output 20.2 of the selection unit 16.1. Outputs of the four data compression units 22.1 to 22.4 are coupled to corresponding inputs of a signal combination unit 24.1.

The signal combination unit 24.1 combines the data compressed signals supplied by the data compression units 22.1, 22.2, 22.3 and 22.4 into a serial datastream, in the same way as described above.

The apparatus now comprises six masked threshold determining units, denoted 26.1 to 26.6. The masked threshold determining units 26.1 to 26.3 are identical to the three masked threshold determining units 26.1 to 26.3 described above with reference to the FIGS. 1 and 2. The fourth masked threshold determining unit 26.4 now receives a combination of the signals L, C and S, more specifically a signal that equals L+C+S, and derives the masked threshold $mt_{L0}$ therefrom. The fifth masked threshold determining unit 26.5 now receives a combination of the signals R, C and S, more specifically a signal that equals R+C+S, and derives a masked threshold $mt_{R0}$ therefrom. The sixth threshold determining unit 26.6 receives the fourth information signal S and derives a masked threshold therefrom and supplies the masked threshold as a sixth masked threshold $mt_S$ to its output.

It should be noted here, that in one of the situations to be described later, the input signal for the masked threshold determining unit 26.5 will be equal to R+C−S.

The apparatus now comprises four selection units 28.1, 28.2, 28.3 and 28.4. The selection units all receive a plurality of masked thresholds to their respective inputs and each select one of those plurality of masked thresholds as a selected masked threshold to its output. In this way, the selection unit 28.4 receives a plurality of masked thresholds to its inputs and selects one of those plurality of masked thresholds so as to obtain a fourth selected masked threshold $mt_4$ and supplies this second selected masked threshold $mt_4$ to its output.

Outputs of the selection units 28.1, 28.2, 28.3 and 28.4 are coupled to a corresponding input of respective instruction signal generator units 30.1, 30.2, 30.3 and 30.4. Each instruction signal generator unit 30.i (where i runs from 1 to 4) generates an instruction signal in response to a masked threshold supplied to its input in a way described above. In this way, the instruction signal generator unit 30.4 calculates a signal-to-mask ratio between the signal $AUX_2$ and the masked threshold supplied by the selection unit 28.4 and subsequently derives bitallocation information therefrom. This bit allocation information is used to quantize the signal $AUX_2$ in the data compression unit 22.4.

The selection made in the selection unit 16. 1, of which two of the four input signals will become the first and second auxiliary signals, is based on the amount of data compression that can be obtained. This has been described in various earlier documents, such as the documents (2) and (8). Generally said, that selection of two out of the four input signals will be made that leads to the highest data reduction that can be obtained. It will be clear that the apparatus therefore comprises a calculation unit 32.1 that generates the selection control signal tca' for the selection unit 16.1.

A selection between two or more masked thresholds is required, as explained above, in order to avoid that, upon decoding in the decoder, the quantisation noise present in any of the regenerated signals L', R', C', S', $L_0'$ and $R_0'$ become audible.

The selection of the masked thresholds will now be described in detail. It should be noted here already that the group of masked thresholds from which one masked threshold should be selected in a selection unit 28.i can be different in the various situations that can occur. Amongst others, the group of masked thresholds depends on which of the four signals have been chosen as the auxiliary signals $AUX_1$ and $AUX_2$.

IIa

Table 3 below shows six situations indicated by the six tca' values tca=0 to tca=5, and indicating the choices for the auxiliary signals $AUX_1$ and $AUX_2$. When C and S are selected as the auxiliary signals (tca'=0), the signals L and R are denoted as first and second main signals $M_1$ and $M_2$ respectively. When L and S are selected as the auxiliary signals (tca'=1), the signals C and R are denoted as first and second main signals $M_1$ and $M_2$ respectively. When R and S are selected as the auxiliary signals (tca'=2), the signals L and C are denoted as first and second main signals $M_1$ and $M_2$ respectively. When C and L are selected as the auxiliary signals (tca'=3), the signals S and R are denoted as first and second main signals $M_1$ and $M_2$ respectively. When C and R are selected as the auxiliary signals (tca'=4), the signals L and S are denoted as first and second main signals $M_1$ and $M_2$ respectively. When L and R are selected as the auxiliary signals (tca'=5), the signals S and C are denoted as first and second main signals $M_1$ and $M_2$ respectively.

TABLE 3

| tca' | $M_1$ | $M_2$ | $AUX_1$ | $AUX_2$ |
|---|---|---|---|---|
| 0 | L | R | C | S |
| 1 | C | R | L | S |
| 2 | L | C | R | S |
| 3 | S | R | C | L |
| 4 | L | S | C | R |
| 5 | C | S | L | R |

It should be noted here that the situation indicated by tca'=5 is only possible for f=−d and b=a, see the eq.5b given above. Thus, in the present example, f=−1.

Suppose first that the calculation unit 32.1 has established that the signals C and S should be selected as the auxiliary signals $AUX_1$ and $AUX_2$. Thus tca'=0.

The selection unit 28.1 will now select the smallest masked threshold from a group of two masked thresholds, which are: $mt_{L0}$ and $mt_L$. The selection unit 28.2 will now select the smallest masked threshold from a group of two masked thresholds, which are: $mt_{R0}$ and $mt_R$. The selection unit 28.3 selects the smallest masked threshold from a group of three masked thresholds, which are: $mt_L$, $mt_R$ and $mt_C$. The selection unit 28.4 selects the smallest masked threshold from a group of three masked thresholds, which are: $mt_L$, $mt_R$ and $mt_S$.

No further explanation will be given to show that all signals regenerated are free from audible quantisation noise.

Suppose now that tca'=1. The selection unit 28.1 will now select the smallest masked threshold from a group of three masked thresholds, which are now: $mt_{L0}$, $mt_C$ and $mt_R$. The selection unit 28.2 will now select the smallest masked threshold from a group of two masked thresholds, which are again: $mt_{R0}$ and $mt_R$. The selection unit 28.3 selects the smallest masked threshold from a group of three masked thresholds, which are: $mt_L$, $mt_R$ and $mt_C$. The selection unit 28.4 selects the smallest masked threshold from a group of two masked thresholds, which are: $mt_C$ and $mt_S$.

Suppose now that tca'=2. The selection unit 28.1 will now select the smallest masked threshold from a group of two masked thresholds, which are again: $mt_{L0}$ and $mt_L$. The selection unit 28.2 will now select the smallest masked threshold from a group of two masked thresholds, which are now: $mt_{R0}$, $mt_C$ and $mt_L$. The selection unit 28.3 selects the smallest masked threshold from a group of three masked thresholds, which are now: $mt_L$, $mt_R$ and $mt_C$. The selection unit 28.4 selects the smallest masked threshold from a group of two masked thresholds, which are now: $mt_C$ and $mt_S$.

Suppose now that tca'=3. The situation tca'=3 can be obtained from the situation tca'=1 by interchanging S and C.

Thus, the selection unit 28.1 will now select the smallest masked threshold from a group of three masked thresholds, which are now: $mt_{L0}$, $mt_S$ and $mt_R$. The selection unit 28.2 will select the smallest masked threshold from a group of two masked thresholds, which are again: $mt_{R0}$ and $mt_R$. The selection unit 28.3 selects the smallest masked threshold from a group of two masked thresholds, which are: $mt_C$ and $mt_S$. The selection unit 28.4 selects the smallest masked threshold from a group of three masked thresholds, which are again: $mt_R$, $mt_L$ and $mt_S$.

The situation tca'=4 can be obtained from the situation tca'==2 by interchanging S and C. Thus, the selection unit 28.1 will now select the smallest masked threshold from a group of two masked thresholds, which are again: $mt_{L0}$ and $mt_L$. The selection unit 28.2 will now select the smallest masked threshold from a group of three masked thresholds, which are now: $mt_{R0}$, $mt_S$ and $mt_L$. The selection unit 28.3 selects the smallest masked threshold from a group of two masked thresholds, which are again: $mt_C$ and $mt_S$. The selection unit 28.4 selects the smallest masked threshold from a group of three masked thresholds, which are again: $mt_L$, $mt_R$ and $mt_S$.

As has been explained above, the situation tca'=5 is only possible if the following equations hold for $L_0$ and $R_0$:

$$L_0 = L + a.C + d.S \quad \text{(Eq.6a)}$$

$$R_0 = R + a.C - d.L \quad \text{(Eq.6b)}$$

Upon decoding the replicas C' and S' of the signals C and S can be obtained from:

$$C' = 0.5\{(L_0' + R_0') - (L' + R')\}/a \quad \text{(Eq.7a)}$$

$$S' = 0.5\{(L_0' - R_0') - (L' - R')\}/d \quad \text{(Eq.7b)}$$

Again, we assume that a=d=1. The selection unit 28.1 will now select the smallest masked threshold from a group of three masked thresholds, which are again: $mt_{L0}$, $mt_C$ and $mt_S$. The selection unit 28.2 will now select the smallest masked threshold from a group of three masked thresholds, which are now: $mt_{R0}$, $mt_C$ and $mt_S$. The selection unit 28.3 selects the smallest masked threshold from a group of three masked thresholds, which are: $mt_L$, $mt_C$ and $mt_S$. The selection unit 28.4 selects the smallest masked threshold from a group of three masked thresholds, which are: $mt_R$, $mt_C$ and $mt_S$.

IIb

In the foregoing, it has been assumed that no prequantisation and subsequent dequantisation has taken place on the first auxiliary signal $AUX_1$ and/or the second auxiliary signal $AUX_2$, prior to matrixing. Prequantisation and subsequent dequantisation on an auxiliary signal prior to matrixing has been described in various prior art documents. Reference is made in this respect to the documents (2) and (8) in the list of related documents.

More specifically, FIG. 9 discloses schematically an embodiment of the encoder apparatus embodying such prequantisation and subsequent dequantisation on the auxiliary signals $AUX_1$ and $AUX_2$, prior to matrixing. As can be seen in FIG. 9, the encoder apparatus further comprises data expansion units 7.1 and 7.2, having inputs coupled to the outputs of the respective data compression units 22.3 and 22.4. The data expansion units 7.1 and 7.2 expand the data compressed auxiliary signals $AUX_1$ and $AUX_2$ so as to obtain replicas $AUX_1'$ and $AUX_2'$. Further, a switching unit 111.1 is required to provide the matrixing unit 10 with all the signals needed for carrying out the matrixing step. The switching unit 111.1 comprises switches 70.1 and 110.1 controlled by the tca' control signal. Further, the matrixing unit 10.2' now requires the reception of the control signal tca'.

For tca'=0, both switches 70.1 and 10. 1 are in their position a-b. For tca'=1, the switch 70.1 is in its position b-c and the switch 110.1 is in its position a-b. For tca'=2, the switch 70.1 is in its position a-b and the switch 110.1 is in its position b-c. For tca'=3, the switch 70.1 is in its position b-d and the switch 110.1 is in its position a-b. For tca'=4, the switch 70.1 is in its position a-b and the switch 110.1 is in its position b-d. For tca'=5, the switch 70.1 is in its position b-c and the switch 110.1 is in its position b-d. The matrixing unit 10.2' now generates composite signals, designated $L_{p0}$ and $R_{p0}$, which indicate that the composite signals comprise a component of the two auxiliary signals that have been quantised and subsequently dequantised. Further, as has been said above, the masked thresholds $mt_{L0}$ and $mt_{R0}$ given in FIG. 8 will be derived from the original signals. So, not the quantised and subsequently prequantised versions of the signals selected as the auxiliary signal are used for obtaining the masked thresholds $mt_{L0}$ and $mt_{R0}$.

For the embodiment of the encoder apparatus of FIG. 9, some of the selections described above will change.

More specifically, for tca'=0, the selection unit 28.1 selects between the masked thresholds $mt_{L0}$ and $mt_L$ and the selection unit 28.2 selects between the masked threshold $mt_{R0}$ and $mt_R$. The selection unit 28.3 selects the smallest masked threshold from a group of three masked thresholds, which are: $mt_{L0}$, $mt_{R0}$ and $mt_C$. The selection unit 28.4 selects the smallest masked threshold from a group of three masked thresholds, which are: $mt_{L0}$, $mt_{R0}$ and $mt_S$.

No further explanation will be given that the selection of the masked thresholds leads to an inaudible quantisation noise in the various signals retrieved in a receiver.

For tca'=1, the selection unit 28.1 selects between the masked thresholds $mt_{L0}$, $mt_C$ and $mt_R$ and the selection unit 28.2 selects between the masked thresholds $mt_{R0}$ and $mt_R$. The selection unit 28.3 now selects the smallest masked threshold from a group of two masked thresholds, which are: $mt_L$ and $mt_{L0}$. The selection unit 28.4 selects the smallest masked threshold from a group of two masked thresholds, which are: $mt_{R0}$, $mt_{L0}$ and $mt_S$.

For tca'=2, the selection unit 28.1 selects between the masked thresholds $mt_{L0}$ and $mt_L$ and the selection unit 28.2 selects between the masked thresholds nitR0, $mt_C$ and $mt_L$. The selection unit 28.3 now selects the smallest masked threshold from a group of two masked thresholds, which are: $mt_R$ and $mt_{R0}$. The selection unit 28.4 now selects the smallest masked threshold from a group of two masked thresholds, which are: $mt_{L0}$, $mt_{R0}$ and $mt_S$.

For tca'=3, the selection unit 28.1 selects between the masked thresholds $mt_{L0}$, $mt_S$ and $mt_R$. The selection unit 28.2 selects between the masked thresholds $mt_{R0}$ and $mt_R$. The selection unit 28.3 selects the smallest masked threshold from a group of three masked thresholds, which are: $mt_{L0}$, $mt_{R0}$ and $mt_C$. The selection unit 28.4 now selects the smallest masked threshold from the masked thresholds $mt_{L0}$ and $mt_L$.

For tca'=4, the selection unit 28.1 will select the smallest masked threshold from a group of two masked thresholds, which are again: $mt_{L0}$ and $mt_L$. The selection unit 28.2 will now select the smallest masked threshold from a group of two masked thresholds, which are: $mt_{R0}$, $mt_S$ and $mt_L$. The selection unit 28.3 selects the smallest masked threshold from a group of three masked thresholds, which are: $mt_{L0}$, $mt_{R0}$ and $mt_C$. The selection unit 28.4 selects the smallest masked threshold from a group of two masked thresholds, which are now: $mt_{R0}$ and $mt_R$.

For tca'=5, the selection unit 28.1 will select the smallest masked threshold from a group of three masked thresholds, which are again: $mt_{L0}$, $mt_C$ and $mt_S$. The selection unit 28.2 will select the smallest masked threshold from a group of three masked thresholds, which are again $mt_{R0}$, $mt_C$ and $mt_S$. The selection unit 28.3 selects the smallest masked threshold from a group of two masked thresholds, which are: $mt_{L0}$ and $mt_L$. The selection unit 28.4 selects the smallest masked threshold from a group of three masked thresholds, which are: $mt_{R0}$ and $mt_R$.

IIc

A further variation of the embodiment described under the situation IIa, is to derive the two composite signals in the following way in the matrixing unit 10.2':

$$L_{p0}=L+C_{pd}+S \quad (Eq.8a)$$

$$R_0=R+C+S \quad (Eq.8b)$$

This means that $L_0$ is derived from $C_{pd}$, which is a prequantised and subsequently dequantised version of C, and from the original signals L and S, whereas $R_0$ is derived from the original signals R, C and S.

For tca'=0, the selections in the selection units 28.1, 28.2 and 28.4 remain the same as described for the situation IIa. The selection unit 28.3, however, flow selects the smallest masked threshold from a group of three masked thresholds, which are: $mt_{L0}$, $mt_R$ and $mt_C$.

For tca'=3, the selections in the selection units 28.1, 28.2 and 28.4 remain the same as described for the situation IIa. The selection unit 28.3, however, now selects the smallest masked threshold from a group of three masked thresholds, which are: $mt_{L0}$, $mt_R$ and $mt_C$.

For tca'=4, the selections in the selection units 28.1, 28.2 and 28.4 remain the same as described for the situation IIa. The selection unit 28.3, however, now selects the smallest masked threshold from a group of four masked thresholds, which are: $mt_{L0}$, $mt_L$, $mt_C$ and $mt_S$.

It should be noted that for the tca' values 1, 2 and 5, C is not selected as an auxiliary signal, and thus does not fit in this situation.

IId

A further variation of the embodiment described under the situation IIa, is to derive the two composite signals in the following way in the matrixing unit 10.2':

$$L_0=L+C+S \quad (Eq.9a)$$

$$R_{p0}=R+C_{pd}+S \quad (Eq.9b)$$

This means that $L_0$ is derived from the original signals L, C and S, that are not prequantised and subsequently dequantised, whereas $R_{p0}$ is derived from $C_{pd}$ which is a prequantised and subsequently dequantised version of C and the original signals R and S.

For tca'=0, the selections in the selection units 28.1, 28.2 and 28.4 remain the same as described for the situation IIa. The selection unit 28.3, however, now selects the smallest masked threshold from a group of three masked thresholds, which are: $mt_L$, $mt_{R0}$ and $mt_C$.

For tca'=3, the selections in the selection units 28.1, 28.2 and 28.4 remain the same as described for the situation IIa.

The selection unit 28.3, however, now selects the smallest masked threshold from a group of four masked thresholds, which are: $mt_{R0}$, $mt_R$, $mt_S$ and $mt_C$.

For tca'=4, the selections in the selection units 28.1, 28.2 and 28.4 remain the same as described for the situation IIa. The selection unit 28.3, however, now selects the smallest masked threshold from a group of three masked thresholds, which are: $mt_L$, $mt_{R0}$ and $mt_C$.

It should be noted that for the tca' values 1, 2 and 5, C is not selected as an auxiliary signal, and thus does not fit in this situation.

IIe

A further variation of the embodiment described under the situation IIa, is to derive the composite signals in the following way in the matrixing unit 10.2':

$$L_{p0}=L+C+S_{pd} \quad (Eq.10a)$$

$$R_0=R+C+S \quad (Eq.10b)$$

This means that $L_0$ is derived from $S_{pd}$, which is a prequantised and subsequently dequantised version of S, and the original signals L and C, whereas $R_0$ is derived from the original signals R, C and S.

For tca'=0, the selections in the selection units 28.1, 28.2 and 28.3 remain the same as described for the situation IIa. The selection unit 28.4, however, now selects the smallest masked threshold from a group of three masked thresholds, which are: $mt_{L0}$, $mt_R$ and $mt_S$.

For tca'=1, the selections in the selection units 28.1, 28.2 and 28.3 remain the same as described for the situation IIa. The selection unit 28.4, however, now selects the smallest masked threshold from a group of three masked thresholds, which are: $mt_{L0}$, $mt_R$ and $mt_S$.

For tca'=2, the selections in the selection units 28.1, 28.2 and 28.3 remain the same as described for the situation IIa. The selection unit 28.4, however, now selects the smallest masked threshold from a group of four masked thresholds, which are: $mt_{L0}$, $mt_L$, $mt_C$ and $mt_S$.

It should be noted that for the tca' values 3, 4 and 5, S is not selected as an auxiliary signal, and thus does not fit in this situation.

IIf

A further variation of the embodiment described under the situation IIa, is to derive the composite signals in the following way in the matrixing unit 10.2':

$$L_0=L+C+S \quad (Eq.11a)$$

$$R_{p0}=R+C+S_{pd} \quad (Eq.11b)$$

This means that $L_0$ is derived from the original signals L, C and S, whereas $R_0$ is derived from $S_{pd}$ which is a prequantised and subsequently dequantised version of C and the original signals R and C.

For tca'=0, the selections in the selection units 28.1, 28.2 and 28.3 remain the same as described for the situation IIa. The selection unit 28.4, however, now selects the smallest masked threshold from a group of three masked thresholds, which are: $mt_L$, $mt_{R0}$ and $mt_S$.

For tca'=1, the selections in the selection units 28.1, 28.2 and 28.3 remain the same as described for the situation IIa. The selection unit 28.4, however, now selects the smallest masked threshold from a group of four masked thresholds, which are: $mt_{R0}$, $mt_R$, $mt_C$ and $mt_S$.

For tca'=2, the selections in the selection units 28.1, 28.2 and 28.3 remain the same as described for the situation IIa.

The selection unit 28.4, however, now selects the smallest masked threshold from a group of three masked thresholds, which are: $mt_L$, $mt_{R0}$ and $mt_S$.

It should be noted that for the tca' values 1, 2 and 5, C is not selected as an auxiliary signal, and thus does not fit in this situation.

IIg

When tca'=1 is chosen, it is known from a prior art document, document (8) in the list of related documents, to carry out a compensation on the second composite signal $R_0$. This is shown in FIG. 5. Also, reference is made in this respect to FIG. 11 and the corresponding description in the document (8).

In this situation, that is the situation IIa, with the addition of the circuit of FIG. 5, but without prequantisation and subsequent dequantisation, the selection unit 28.1 will now select the smallest masked threshold from a group of three masked thresholds, which are now: $mt_{L0}$, $mt_{R0}$ and $mt_C$.

In the same way, when tca'=3 is chosen, the selection unit 28.1 will now select the smallest masked threshold from a group of three masked thresholds, which are $mt_{L0}$, $mt_{R0}$ and $mt_S$.

IIh

When tca'=2 in situation IIa is chosen, it is known from a prior art document, document (8) in the list of related documents, to carry out a compensation on the first composite signal $L_0$. This is shown in FIG. 6. Also, reference is made in this respect to FIG. 12 and the corresponding description in the document (8).

In this situation, the selection unit 28.2 will now select the smallest masked threshold from a group of three masked thresholds, which are now: $mt_{L0}$, $mt_{R0}$ and $mt_C$.

In the same way, when tca'=4 is chosen the selection unit 28.2 will now select the smallest masked threshold from a group of three masked thresholds, which are $mt_{L0}$, $mt_{R0}$ and $mt_S$.

IIi

When tca'=5 is chosen, an embodiment could be thought of where the first auxiliary signal ($AUX_1$=L) is prequantised and subsequently dequantized, prior to matrixing in the matrixing unit and the second auxiliary signal ($AUX_2$=R) is not prequantized. In this situation, the selection unit 28.1 will select the smallest masked threshold from a group of three masked thresholds, which are: $mt_{L0}$, $mt_C$ and $mt_S$. The selection unit 28.2 will select the smallest masked threshold from a group of three masked thresholds, which are: $mt_{R0}$, $mt_C$ and $mt_S$. The selection unit 28.3 selects the smallest masked threshold from a group of two masked thresholds; which are: $mt_{L0}$ and $mt_L$. The selection unit 28.4 selects the smallest masked threshold from a group of three masked thresholds, which are: $mt_R$, $mt_C$ and $mt_S$.

IIj

When tca'=5 is chosen, another embodiment could be thought of where the first auxiliary signal ($AUX_1$=L) is not prequantised and the second auxiliary signal ($AUX_2$=R) is prequantized and subsequently dequantized, prior to matrixing in the matrixing unit. In this situation, the selection unit 28.1 will select the smallest masked threshold from a group of three masked thresholds, which are: $mt_{L0}$, $mt_C$ and $mt_S$. The selection unit 28.2 will select the smallest masked threshold from a group of three masked thresholds, which are: $mt_{R0}$, $mt_C$ and $mt_S$. The selection unit 28.3 selects the smallest masked threshold from a group of three masked thresholds, which are: $mt_L$, $mt_C$ and $mt_S$. The selection unit 28.4 selects the smallest masked threshold from a group of two masked thresholds, which are: $mt_{R0}$ and $mt_R$.

The tables 4 and 5 comprises all selections of the masked thresholds in the four selection units 28.1, 28.2, 28.3 and 28.4 for the situations described above, for the four channel case.

TABLE 4

| situation | tca' | 28.1 | 28.2 | 28.3 | 28.4 |
|---|---|---|---|---|---|
| IIa | 0 | $mt_{L0},mt_L$ | $mt_{R0},mt_R$ | $mt_L,mt_R,mt_C$ | $mt_L,mt_R,mt_S$ |
|  | 1 | $mt_{L0},mt_C,mt_R$ | $mt_{R0},mt_R$ | $mt_L,mt_R,mt_C$ | $mt_C,mt_S$ |
|  | 2 | $mt_{L0},mt_L$ | $mt_{R0},mt_C,mt_L$ | $mt_L,mt_R,mt_C$ | $mt_C,mt_S$ |
|  | 3 | $mt_{L0},mt_S,mt_R$ | $mt_{R0},mt_R$ | $mt_C,mt_S$ | $mt_L,mt_R,mt_S$ |
|  | 4 | $mt_{L0},mt_L$ | $mt_{R0},mt_S,mt_L$ | $mt_C,mt_S$ | $mt_L,mt_R,mt_S$ |
|  | 5 | $mt_{L0},mt_C,mt_S$ | $mt_{R0},mt_C,mt_S$ | $mt_L,mt_C,mt_S$ | $mt_R,mt_C,mt_S$ |
| IIb | 0 |  |  | $mt_{L0},mt_{R0},mt_C$ | $mt_{L0},mt_{R0},mt_S$ |
|  | 1 |  |  | $mt_{L0},mt_L$ | $mt_{L0},mt_{R0},mt_S$ |
|  | 2 |  |  | $mt_{R0},mt_R$ | $mt_{L0},mt_{R0},mt_S$ |
|  | 3 |  |  | $mt_{L0},mt_{R0},mt_C$ | $mt_{L0},mt_L$ |
|  | 4 |  |  | $mt_{L0},mt_{R0},mt_C$ | $mt_{R0},mt_R$ |
|  | 5 |  |  | $mt_{L0},mt_L$ | $mt_{R0}mt_R$ |
| IIc | 0 |  |  | $mt_{L0},mt_R,mt_C$ |  |
|  | 3 |  |  | $mt_{L0},mt_R,mt_C$ |  |
|  | 4 |  |  | $mt_{L0},mt_C,mt_S,mt_L$ |  |
| IId | 0 |  |  | $mt_{R0},mt_L,mt_C$ |  |
|  | 3 |  |  | $mt_{R0},mt_R,mt_C,mt_S$ |  |
|  | 4 |  |  | $mt_{R0},mt_L,mt_C$ |  |
| IIe | 0 |  |  |  | $mt_{L0},mt_R,mt_S$ |
|  | 1 |  |  |  | $mt_{L0},mt_R,mt_S$ |
|  | 2 |  |  |  | $mt_{L0},mt_L,mt_C,mt_S$ |

TABLE 5

| situation | tca' | 28.1 | 28.2 | 28.3 | 28.4 |
|---|---|---|---|---|---|
| IIf | 0 | | | | $mt_{RO},mt_L,mt_S$ |
|  | 1 | | | | $mt_{RO},mt_C,mt_S,mt_R$ |
|  | 2 | | | | $mt_{RO},mt_L,mt_S$ |
| IIg | 1 | $mt_{LO},mt_{RO},mt_C$ | | | |
|  | 3 | $mt_{LO},mt_{RO},mt_S$ | | | |
| IIh | 2 | | $mt_{LO},mt_{RO},mt_C$ | | |
|  | 4 | | $mt_{LO},mt_{RO},mt_S$ | | |
| IIi | 5 | | | $mt_L,mt_{LO}$ | |
| IIj | 5 | | | | $mt_R,mt_{RO}$ |

It should be noted here that the masked thresholds in the positions not filled in in the tables 4 and 5 for the situations IIb to IIj are identical to the masked thresholds filled in in the corresponding positions in the situation IIa. Further, when combining the situations IIb and any other situation, such as IIe, the selections given under the other situation (IIe) should replace the selections given in IIb.

From the tables 4 and 5 it is clear that the selection unit 28.1 requires at least the masked thresholds $mt_L$ and $mt_{LO}$. Further, additional masked thresholds $mt_C$ and $mt_S$ are required for carrying out the selection. When it relates to the embodiment of the situation IIa (tca=1), also the masked threshold $mt_R$ is required. Further, in the situation IIg, also the masked threshold $mt_{RO}$ is required. FIG. 8 therefore shows schematically a connection between the outputs of the masked threshold determining units 26.1 to 26.6 and the selection unit 28.1. Dependent of the embodiment of the encoder apparatus discussed, that is: dependent of the situation given in the table, and dependent of the value for tca', the required masked thresholds given in the table will be supplied to the selection unit 28.1.

It is further clear from the tables 4 and 5 that the selection unit 28.2 requires at least the masked thresholds $mt_R$ and $mt_{RO}$. Further, the masked thresholds $mt_C$ and $mt_S$ are required for carrying out the selection. When it relates to the embodiment of the situation IIa (tca=2), also the masked threshold $mt_L$ is required. Further, in the situation IIh, also the masked threshold $mt_{LO}$ is required. FIG. 8 therefore shows schematically a connection between the outputs of the masked threshold determining units 26.1 to 26.6 and the selection unit 28.2. Dependent of the embodiment of the encoder apparatus discussed, that is: dependent of the situation given in the table, and dependent of the value for tca', the required masked thresholds given in the table will be supplied to the selection unit 28.2.

It is also clear from the tables 4 and 5 that the selection unit 28.3 requires at least the masked thresholds $mt_C$ and $mt_S$ for carrying out the selection. Further, the masked thresholds $mt_L$, $mt_R$ are required for carrying out the selection. When it relates to the embodiment of the situation IIb, also the masked thresholds $mt_{LO}$ and $mt_{RO}$ are also required. FIG. 8 therefore shows schematically a connection between the outputs of the masked threshold determining units 26.1 to 26.6 and the selection unit 28.3. Dependent of the embodiment of the encoder apparatus discussed, that is: dependent of the situation given in the table, and dependent of the value for tca', the required masked thresholds given in the table will be supplied to the selection unit 28.3.

It will further be clear from the tables 4 and 5 that the selection unit 28.4 will require the same masked thresholds as the selection unit 28.3.

In order to realize the correct selection for the various tca' values, it will be apparent that the selection units 28.1, 28.2, 28.3 and 28.4 require the supply of the tca' control signal, as shown in FIG. 8.

III. A 5-channel encoder apparatus

IIIa

The FIGS. 10 and 11 show an embodiment of a encoder apparatus for encoding a 5-channel information signal, such as a 5-channel audio signal comprising the left hand signal component (L), the right hand signal component (R), the centre sign al component (C), a left hand surround signal component ($S_1$) and a right hand surround signal component ($S_r$). The encoder apparatus shows large resemblances with the encoder apparatuses of the FIGS. 1 and 2 and 7 and 8. Apart from the elements already discussed with reference to the FIGS. 7 and 8, the embodiment of the FIGS. 10 and 11 comprise a fourth input terminal 4 for receiving a fourth information signal in the form of the left hand surround signal $S_1$ and a fifth input terminal 5 for receiving the fifth information signal $S_r$. The input terminal 5 is coupled to a corresponding input of the matrixing unit 10.3. The matrixing unit 10.3 has two outputs 12 and 14 for supplying the first composite signal $L_0$ and the second composite signal $R_0$. The composite signals have the following relationship with the signals L, R, C, $S_1$ and $S_r$:

$$L_0 = L + a.C + d.S_1 \qquad \text{(Eq. 10a)}$$

$$R_0 = R + b.C + f.S_r \qquad \text{(Eq. 10b)}$$

where a, b, d and f are constants for which holds that they all are smaller than or equal to 1. Let us assume for the moment that a=b=d=f=1.

The input terminal 5 is also coupled to a corresponding input of the first selection unit 16.2. This selection unit 16.2 selects three of the signals applied to its five inputs under the influence of a selection signal tca" applied to the terminal 18 and supplies the selected signals as first, second and third auxiliary signals $AUX_1$, $AUX_2$ and $AUX_3$ respectively, to its outputs 20.1, 20.2 and 20.3 respectively. A fifth data compression unit 22.5 is provided for carrying out a data compression step on the signal $AUX_3$. An output of the data compression unit 22.5 is coupled to a corresponding input of a signal combination unit 24.2.

The signal combination unit 24.2 combines the data compressed signals supplied by the data compression units 22.1, 22.2, 22.3, 22.4 and 22.5 into a serial datastream, in the same way as described above.

The apparatus now comprises seven masked threshold determining units, denoted 26.1 to 26.7. The masked threshold determining units 26.1, 26.2 and 26.3 receive the signals L, R and C respectively and derive therefrom the masked thresholds $mt_L$, $mt_R$ and $mt_C$ respectively.

The masked threshold determining unit 26.4 now receives a combination of the signals L, C and $S_1$, more specifically a signal that equals $L+C+S_1$, and derives the masked threshold $mt_{L0}$ therefrom. The masked threshold determining unit 26.5 now receives a combination of the signals R, C and $S_r$, more specifically a signal that equals $R+C+S_r$, and derives a masked threshold $mt_{R0}$ therefrom. The sixth threshold determining unit 26.6 receives the fourth information signal $S_1$ and derives a masked threshold therefrom and supplies the masked threshold as a sixth masked threshold $mt_{S1}$, to its output. The seventh threshold determining unit 26.7 receives the fourth information signal $S_r$ and derives a masked threshold therefrom and supplies the masked threshold as a seventh masked threshold $mt_{Sr}$ to its output.

The apparatus now comprises five selection units 28.1, 28.2, 28.3, 28.4 and 28.5. The selection units all receive a plurality of masked thresholds to their respective inputs and each select one of those plurality of masked thresholds as a selected masked threshold to its output. In this way, the selection unit 28.4 receives a plurality of masked thresholds to its inputs and selects one of those plurality of masked thresholds so as to obtain a fourth selected masked threshold $mt_4$ and supplies this fourth selected masked threshold $mt_4$ to its output. In the same way, the selection unit 28.5 receives a plurality of masked thresholds to its inputs and selects one of those plurality of masked thresholds so as to obtain a fifth selected masked threshold $mt_5$ and supplies this fifth selected masked threshold $mt_5$ to its output.

Outputs of the selection units 28.1, 28.2, 28.3, 28.4 and 28.5 are coupled to a corresponding input of respective instruction signal generator units 30.1, 30.2, 30.3, 30.4 and 30.5. Each instruction signal generator unit 30.i (where i runs from 1 to 5) generates an instruction signal in response to a masked threshold supplied to its input in a way described above. In this way, the instruction signal generator unit 30.5 calculates a signal-to-mask ratio between the signal $AUX_3$ and the masked threshold supplied by the selection unit 28.5 and subsequently derives bitallocation information therefrom. This bit allocation information is used to quantize the signal $AUX_3$ in the data compression unit 22.5.

The selection made in the selection unit 16.2, of which three of the five input signals will become the first, second and third auxiliary signals, is based on the amount of data compression that can be obtained. This has been described in various earlier documents, such as the documents (2) and (8). Generally said, that selection of three out of the five input signals will be made that leads to the highest data reduction that can be obtained. It will be clear that the apparatus therefore comprises a calculation unit 32.2 that generates the selection control signal tca" for the selection unit 16.2.

A selection between two or more masked thresholds is required, as explained above, in order to avoid that the quantisation noise present in the replicas of the signals L, R, C, $S_1$, $S_r$, $L_0$ and $R_0$ become audible upon decoding.

The selection of the masked thresholds will now be described. It should be noted here already that the group of masked thresholds from which one masked threshold should be selected in a selection unit 28.i can be different in the various situations that can occur. Amongst others, the group of masked thresholds depends on1 which of the five signals have been chosen as the auxiliary signals $AUX_1$, $AUX_2$ and $AUX_3$.

IIIa

Table 6 below shows eight situations indicated by the eight tca" values tca=0 to tca=7, and indicating the choices for the auxiliary signals $AUX_1$, $AUX_2$ and $AUX_3$. When C, $S_1$ and $S_r$ are selected as the auxiliary signals (tca" =0), the signals L and R are denoted as first and second main signals $M_1$ and $M_2$ respectively. When L, S, and $S_r$ are selected as the auxiliary signals (tca"=1), the signals C and R are denoted as first and second main signals $M_1$ and $M_2$ respectively. When R, $S_1$ and $S_r$ are selected as the auxiliary signals (tca"=2), the signals L and C are denoted as first and second main signals $M_1$ and $M_2$ respectively. When C and L and $S_r$ are selected as the auxiliary signals (tca"=3), tile signals $S_1$ and R are denoted as first and second main signals $M_1$ and $M_2$ respectively. When C, $S_1$ and R are selected as the auxiliary signals (tca"=4), tile signals L and $S_r$ are denoted as first and second main signals $M_1$ and $M_2$ respectively. When C, $S_1$ and R are selected as the auxiliary signals (tca"=5), the signals $S_1$ and $S_r$ are denoted as first and second main signals $M_1$ and $M_2$ respectively. When L, R and $S_r$ are selected as the auxiliary signals (tca"=6), the signals $S_1$ and C are denoted as first and second main signals $M_1$ and $M_2$ respectively. When L, $S_1$ and R are selected as the auxiliary signals (tca"=7), the signals C and $S_r$ are denoted as first and second main signals $M_1$ and $M_2$ respectively.

TABLE 4

| tca" | $M_1$ | $M_2$ | $AUX_1$ | $AUX_2$ | $AUX_3$ |
|---|---|---|---|---|---|
| 0 | L | R | C | $S_1$ | $S_r$ |
| 1 | C | R | L | $S_1$ | $S_r$ |
| 2 | L | C | R | $S_1$ | $S_r$ |
| 3 | $S_1$ | R | C | L | $S_r$ |
| 4 | L | $S_r$ | C | $S_1$ | R |
| 5 | $S_1$ | $S_r$ | C | L | R |
| 6 | $S_1$ | C | R | L | $S_r$ |
| 7 | C | $S_r$ | L | $S_1$ | R |

Suppose first that the calculation unit 32.2 has established that the signals C, $S_1$ and $S_r$ should be selected as the auxiliary signals $AUX_1$, $AUX_2$ and $AUX_3$. Thus tca"=0.

The selection unit 28.1 will now select the smallest masked threshold from a group of two masked thresholds, which are: $mt_{L0}$ and $mt_L$. The selection unit 28.2 will now select the smallest masked threshold from a group of two masked thresholds, which are: $mt_{R0}$ and $mt_R$.

The selection unit 28.3 selects the smallest masked threshold from a group of three masked thresholds, which are: $mt_L$, $mt_R$ and $mt_C$.

The selection unit 28.4 selects the smallest masked threshold from a group of two masked thresholds, which are: $mt_L$ and $mt_{S1}$.

The selection unit 28.5 selects the smallest masked threshold from a group of two masked thresholds, which are: $mt_R$ and $mt_{Sr}$.

Suppose now that tca"=1. The selection unit 28.1 will now select the smallest masked threshold from a group of three masked thresholds, which are now: $mt_{L0}$, $mt_C$ and $mt_R$. The selection unit 28.2 will now select the smallest masked threshold from a group of two masked thresholds, which are again: $mt_{R0}$ and $mt_R$.

The selection unit 28.3 selects the smallest masked threshold from a group of three masked thresholds, which are: $mt_L$, $mt_R$ and $mt_C$. The selection unit 28.4 selects the smallest masked threshold from a group of three masked thresholds, which are: $mt_R$, $mt_C$ and $mt_{S1}$. The selection unit 28.5 selects the smallest masked threshold from a group of two masked thresholds, which are: $mt_R$ and $mt_{Sr}$.

Suppose now that tca"=2. The selection unit 28.1 will now select the smallest masked threshold from a group of two masked thresholds, which are again: $mt_{L0}$ and $mt_L$. The selection unit 28.2 will now select the smallest masked threshold from a group of three masked thresholds, which are now: $mt_{R0}$, $mt_C$ and $mt_L$. The selection unit 28.3 selects the smallest masked threshold from a group of three masked thresholds, which are now: $mt_L$, $mt_R$ and $mt_C$. The selection unit 28.4 selects the smallest masked threshold from a group of two masked thresholds, which are now: $mt_L$ and $mt_{S1}$. The selection unit 28.5 selects the smallest masked threshold from a group of three masked thresholds, which are now: $mt_L$, $mt_C$ and $mt_{Sr}$.

Suppose now that tca"=3. This is the situation of tca"=0, where L and $S_1$ are interchanged. The selection unit 28.1 will now select the smallest masked threshold from a group of two masked thresholds, which are: $mt_{L0}$ and $mt_{S1}$. The selection unit 28.2 will select the smallest masked threshold from a group of two masked thresholds, which are again: $mt_{R0}$ and $mt_R$. The selection unit 28.3 selects the smallest masked threshold from a group of three masked thresholds, which are: $mt_{S1}$, $mt_R$ and $mt_C$. The selection unit 28.4 selects the smallest masked threshold from a group of two masked thresholds, which are again: $mt_L$ and $mt_{S1}$. The selection unit 28.5 selects the smallest masked threshold from a group of two masked thresholds, which again: $mt_R$ and $mt_{Sr}$.

The situation tca"=4 can be obtained from the situation tca"=2 by interchanging $S_r$ and R. Thus, the selection unit 28.1 will now select the smallest masked threshold from a group of two masked thresholds, which are again: $mt_{L0}$ and $mt_L$. The selection unit 28.2 will now select the smallest masked threshold from a group of two masked thresholds, which are now: $mt_{R0}$ and $mt_{Sr}$. The selection unit 28.3 selects the smallest masked threshold from a group of three masked thresholds, which are now: $mt_L$, $mt_{Sr}$ and $mt_C$. The selection unit 28.4 selects the smallest masked threshold from a group of two masked thresholds, which are: $mt_L$ and $mt_{S1}$. The selection unit 28.5 selects the smallest masked threshold from a group of two masked thresholds, which are: $mt_R$ and $mt_{Sr}$.

The situation tca"=5 can be obtained from the situation tca"=0 by interchanging $S_1$ by L and $S_r$ by R. The selection unit 28.1 will now select the smallest masked threshold from a group of two masked thresholds, which are again: $mt_{L0}$ and $mt_{S1}$. The selection unit 28.2 will now select the smallest masked threshold from a group of two masked thresholds, which are now: $mt_{R0}$ and $mt_{Sr}$. The selection unit 28.3 selects the smallest masked threshold from a group of three masked thresholds, which are: $mt_{S1}$, $mt_{Sr}$ and $mt_C$. The selection unit 28.4 selects the smallest masked threshold from a group of two masked thresholds, which are: $mt_L$ and $mt_{S1}$. The selection unit 28.5 selects the smallest masked threshold from a group of two masked thresholds, which are: $mt_R$ and $mt_{Sr}$.

The situation tca"=6 can be obtained from the situation tca"=2 by interchanging $S_1$ by L. The selection unit 28.1 will now select the smallest masked threshold from a group of two masked thresholds, which are again: $mt_{L0}$ and $mt_{S1}$. The selection unit 28.2 will now select the smallest masked threshold from a group of three masked thresholds, which are now: $mt_{R0}$, $mt_C$ and $mt_{S1}$. The selection unit 28.3 selects the smallest masked threshold from a group of masked thresholds, which are: $mt_R$, $mt_{S1}$ and $mt_C$. The selection unit 28.4 selects the smallest masked threshold from a group of two masked thresholds, which are: $mt_L$ and $mt_{S1}$. The selection unit 28.5 selects the smallest masked threshold from a group of three masked thresholds, which are: $mt_C$, $mt_{S1}$ and $mt_{Sr}$.

The situation tca"=7 can be obtained from the situation tca"=$_1$ by interchanging R by $S_r$. The selection unit 28.1 will now select the smallest masked threshold from a group of three masked thresholds, which are again: $mt_{L0}$, $mt_C$ and $mt_{Sr}$. The selection unit 28.2 will now select the smallest masked threshold from a group of two masked thresholds, which are now: $mt_{R0}$ and $mt_{Sr}$. The selection unit 28.3 selects the smallest masked threshold from a group of three masked thresholds, which are: $mt_L$, $mt_{Sr}$ and $mt_C$. The selection unit 28.4 selects the smallest masked threshold from a group of three masked thresholds, which are: $mt_C$, $mt_{S1}$ and $mt_{Sr}$. The selection unit 28.5 selects the smallest masked threshold from a group of two masked thresholds, which are: $mt_R$ and $mt_{Sr}$.

IIIb

In the foregoing, it has been assumed that no prequantisation and subsequent dequantisation has taken place on the first, second and third auxiliary signals $AUX_1$, $AUX_2$ and $AUX_3$, prior to matrixing. Prequantisation and subsequent dequantisation on an auxiliary signal prior to matrixing has been described in various prior art documents. Reference is made in this respect to the documents (2) and (8) in the list of related documents.

No further embodiment comprising such prequantisation and subsequent dequantisation on the auxiliary signals, prior to matrixing, will be disclosed, as such embodiment is evident, after having discussed the embodiments of the FIGS. 4 and 9 above.

For an embodiment of the encoder apparatus embodying prequantization and subsequent dequantization, prior to matrixing, some of the selections described above will change.

More specifically, for tca"=0, the selection unit 28.3 selects the smallest masked threshold from a group of masked thresholds, which are: $mt_{L0}$, $mt_{R0}$ and $mt_C$. The selection unit 28.4 selects the smallest masked threshold from a group of two masked thresholds, which are: $mt_{L0}$ and $mt_{S1}$. The selection unit 28.5 selects the smallest masked threshold from a group of two masked thresholds, which are: $mt_{R0}$ and $mt_{Sr}$.

For tca"=1, the selection unit 28.3 selects the smallest masked threshold from a group of masked thresholds, which are: $mt_L$ and $mt_{L0}$. The selection unit 28.4 selects the smallest masked threshold from a group of two masked thresholds, which are: $mt_{L0}$ and $mt_{S1}$. The selection unit 28.5 selects the smallest masked threshold from a group of two masked thresholds, which are: $mt_{R0}$ and $mt_{Sr}$.

For tca"=$_2$, the selection unit 28.3 selects the smallest masked threshold from a group of masked thresholds, which are: $mt_R$ and $mt_{R0}$. The selection unit 28.4 selects the smallest masked threshold from a group of two masked thresholds, which are: $mt_{L0}$ and $mt_{S1}$. The selection unit 28.5 selects the smallest masked threshold from a group of two masked thresholds, which are: $mt_{R0}$ and $mt_{Sr}$.

For tca"=3, the selection unit 28.3 selects the smallest masked threshold from a group of masked thresholds, which are: $mt_{L0}$, $mt_{R0}$ and $mt_C$. The selection unit 28.4 selects the smallest masked threshold from a group of two masked thresholds, which are: $mt_{L0}$ and $mt_L$. The selection unit 28.5 selects the smallest masked threshold from a group of two masked thresholds, which are: $mt_{R0}$ and $mt_{Sr}$.

For tca"=4, the selection unit 28.3 selects the smallest masked threshold from a group of masked thresholds, which are: $mt_C$, $mt_{L0}$ and $mt_{R0}$. The selection unit 28.4 selects the smallest masked threshold from a group of two masked thresholds, which are: $mt_{L0}$ and $mt_{S1}$. The selection unit 28.5 selects the smallest masked threshold from a group of two masked thresholds, which are: $mt_{R0}$ and $mt_R$.

For tca"=5, the selection unit 28.3 selects the smallest masked threshold from a group of masked thresholds, which are: $mt_C$, $mt_{L0}$ and $mt_{R0}$. The selection unit 28.4 selects the smallest masked threshold from a group of two masked thresholds, which are: $mt_{L0}$ and $mt_L$. The selection unit 28.5 selects the smallest masked threshold from a group of two masked thresholds, which are: $mt_{R0}$ and $mt_R$.

For tca"=6, the selection unit 28.3 selects the smallest masked threshold from a group of masked thresholds, which are: $mt_R$ and $mt_{R0}$. The selection unit 28.4 selects the smallest masked threshold from a group of two masked thresholds, which are: $mt_{L0}$ and $mt_L$. The selection unit 28.5 selects the smallest masked threshold from a group of two masked thresholds, which are: $mt_{R0}$ and $mt_{Sr}$.

For tca"=7, the selection unit 28.3 selects the smallest masked threshold from a group of masked thresholds, which are: $mt_L$ and $mt_{L0}$. The selection unit 28.4 selects the smallest masked threshold from a group of two masked thresholds, which are: $mt_{L0}$ and $mt_{S1}$. The selection unit 28.5 selects the smallest masked threshold from a group of two masked thresholds, which are: $mt_{R0}$ and $mt_R$.

IIIc

A further variation of the embodiment described under the situation IIIa, is to derive the two composite signals in the following way in the matrixing unit 10.3:

$$L_{p0} = L + C_{pd} + S_1 + S_r \qquad (Eq.12a)$$

$$R_0 = R + C + S_1 + S_r \qquad (Eq.12b)$$

This means that $L_0$ is derived from $C_{pd}$, which is a prequantised and subsequently dequantised version of C, and from the original signals L, $S_1$ and $S_r$, whereas $R_0$ is derived from the original signals R, C, $S_1$ and $S_r$.

All the selections in the selection units 28.1, 28.2, 28.4 and 28.5 remain the same, for the same tca" values as in the situation IIIa. Only the selections in the selection unit 28.3 will change.

For tca41=0, the selection unit 28.3 now selects the smallest masked threshold from a group of three masked thresholds, which are: $mt_{L0}$, $mt_R$ and $mt_C$.

For tca"=3, the selection unit 28.3 now selects the smallest masked threshold from a group of three masked thresholds, which are: $mt_{L0}$, $mt_R$ and $mt_C$.

For tca"=4, the selection unit 28.3 now selects the smallest masked threshold from a group of masked thresholds, which are: $mt_{L0}$, $mt_C$ and $mt_{Sr}$.

For tca"=5, the selection unit 28.3 also selects the smallest masked threshold from a group of masked thresholds, which are: $mt_{L0}$, $mt_C$ and $mt_{Sr}$.

It should be noted that for the tca' values 1, 2, 6 and 7, C is not selected as an auxiliary signal, and thus does not fit in this situation.

IIId

A further variation of the embodiment described under the situation IIa, is to derive the two composite signals in the following way in the matrixing unit 10.2':

$$L_0 = L + C + S_1 + S_r \qquad (Eq.13a)$$

$$R_{p0} = R + C_{pd} + S_1 + S_r \qquad (Eq.14b)$$

This means that $L_0$ is derived from the original signals L, C, $S_1$ and $S_r$, that are not prequantised and subsequently dequantised, whereas $R_{p0}$ is derived from $C_{pd}$ which is a prequantised and subsequently dequantised version of C and the original signals R, $S_1$ and $S_r$.

All the selections in the selection units 28.1, 28.2, 28.4 and 28.5 remain the same, for the same tca" values as in the situation IIIa. Only the selections in the selection unit 28.3 will change.

For tca"=0, the selection unit 28.3 now selects the smallest masked threshold from a group of three masked thresholds, which are: $mt_L$, $mt_{R0}$ and $mt_C$.

For tca"=3, the selection unit 28.3 selects the smallest masked threshold from a group of three masked thresholds, which are: $mt_{R0}$, $mt_C$ and $mt_{S1}$.

For tca"=4, the selection unit 28.3 selects the smallest masked threshold from a group of three masked thresholds, which are: $mt_L$, $mt_{R0}$ and $mt_C$.

For tca"=5, the selection unit 28.3 selects the smallest masked threshold from a group of three masked thresholds, which are: $mt_{S1}$, $mt_{R0}$ and $mt_C$.

It should be noted that for the tca' values 1, 2, 6 and 7, C is not selected as an auxiliary signal, and thus does not fit in this situation.

IIIe

When tca"=1 is chosen in the situation IIIa, it is known from a prior art document, document (8) in the list of related documents, to carry out a compensation on the second composite signal $R_0$. This is shown in FIG. 5. Also, reference is made in this respect to FIG. 11 and the corresponding description in the document (8).

In this situation, that is the situation IIIa, with the addition of the circuit of FIG. 5, but without prequantisation and subsequent dequantisation, the selection unit 28.1 will now select the smallest masked threshold from a group of three masked thresholds, which are now: $mt_{L0}$, $mt_{R0}$ and $mt_C$.

In the same way, when tca"=7 is chosen, the selection unit 28.1 will now select the smallest masked threshold from a group of three masked thresholds, which are $mt_{L0}$, $mt_{R0}$ and $mt_C$.

IIIh

When tca"=2 in situation IIa is chosen, it is known from a prior art document, document (8) in the list of related documents, to carry out a compensation oil the first composite signal $L_0$. This is shown in FIG. 6. Also, reference is made in this respect to FIG. 12 and the corresponding description in the document (8).

In this situation, the selection unit 28.2 will now select the smallest masked threshold from a group of three masked thresholds, which are now: $mt_{L0}$, $mt_{R0}$ and $mt_C$.

In the same way, when tca"=6 is chosen, the selection unit 28.2 will now select the smallest masked threshold from a group of three masked thresholds, which are $mt_{L0}$, $mt_{R0}$ and $mt_C$.

The tables 7 and 8 comprises all selections of the masked thresholds in the five selection units 28.1, 28.2, 28.3, 28.4 and 28.5 for the situations described above, for the five channel case.

TABLE 7

| situation | tca" | 28.1 | 28.2 | 28.3 | 28.4 | 28.5 |
|---|---|---|---|---|---|---|
| IIIa | 0 | $mt_{L0},mt_L$ | $mt_{R0},mt_R$ | $mt_L,mt_R,mt_C$ | $mt_L,mt_{S1}$ | $mt_R,mt_{Sr}$ |
| | 1 | $mt_{L0},mt_C,mt_R$ | $mt_{R0},mt_R$ | $mt_L,mt_R,mt_C$ | $mt_R,mt_C,mt_{S1}$ | $mt_R,mt_{Sr}$ |
| | 2 | $mt_{L0},mt_L$ | $mt_{R0},mt_C,mt_L$ | $mt_L,mt_R,mt_C$ | $mt_L,mt_{S1}$ | $mt_L,mt_C,mt_{Sr}$ |
| | 3 | $mt_{L0},mt_{S1}$ | $mt_{R0},mt_R$ | $mt_{S1},mt_R,mt_C$ | $mt_L,mt_{S1}$ | $mt_R,mt_{Sr}$ |
| | 4 | $mt_{L0},mt_L$ | $mt_{R0},mt_{Sr}$ | $mt_{Sr},mt_L,mt_C$ | $mt_L,mt_{S1}$ | $mt_R,mt_{Sr}$ |
| | 5 | $mt_{L0},mt_{S1}$ | $mt_{R0},mt_{Sr}$ | $mt_{S1},mt_{Sr},mt_C$ | $mt_L,mt_{S1}$ | $mt_R,mt_{Sr}$ |
| | 6 | $mt_{L0},mt_{S1}$ | $mt_{R0},mt_C,mt_{S1}$ | $mt_{S1},mt_R,mt_C$ | $mt_L,mt_{S1}$ | $mt_C,mt_{S1},mt_{Sr}$ |
| | 7 | $mt_{L0},mt_C,mt_{Sr}$ | $mt_{R0},mt_{Sr}$ | $mt_{Sr},mt_L,mt_C$ | $mt_C,mt_{S1},mt_{Sr}$ | $mt_R,mt_{Sr}$ |
| IIIb | 0 | | | $mt_{L0},mt_{R0},mt_C$ | $mt_{L0},mt_{S1}$ | $mt_{R0},mt_{Sr}$ |
| | 1 | | | $mt_L,mt_{L0}$ | $mt_{L0},mt_{S1}$ | $mt_{R0},mt_{Sr}$ |
| | 2 | | | $mt_R,mt_{R0}$ | $mt_{L0},mt_{S1}$ | $mt_{R0},mt_{Sr}$ |
| | 3 | | | $mt_{L0},mt_{R0},mt_C$ | $mt_{L0},mt_L$ | $mt_{R0},mt_{Sr}$ |
| | 4 | | | $mt_{L0},mt_{R0},mt_C$ | $mt_{L0},mt_{S1}$ | $mt_{R0},mt_R$ |
| | 5 | | | $mt_{L0},mt_{R0},mt_C$ | $mt_{L0},mt_L$ | $mt_{R0},mt_R$ |
| | 6 | | | $mt_R,mt_{R0}$ | $mt_{L0},mt_L$ | $mt_{R0},mt_{Sr}$ |
| | 7 | | | $mt_L,mt_{L0}$ | $mt_{L0},mt_{S1}$ | $mt_{R0},mt_R$ |
| IIIc | 0 | | | $mt_{L0},mt_R,mt_C$ | | |
| | 3 | | | $mt_{L0},mt_R,mt_C$ | | |
| | 4 | | | $mt_{L0},mt_{Sr},mt_C$ | | |
| | 5 | | | $mt_{L0},mt_{Sr},mt_C$ | | |

TABLE 8

| situation | tca" | 28.1 | 28.2 | 28.3 | 28.4 | 28.5 |
|---|---|---|---|---|---|---|
| IIId | 0 | | | $mt_L,mt_{R0},mt_C$ | | |
| | 3 | | | $mt_{S1},mt_{R0},mt_C$ | | |
| | 4 | | | $mt_L,mt_{R0},mt_C$ | | |
| | 5 | | | $mt_{S1},mt_{R0},mt_C$ | | |
| IIIe | 1 | $mt_{L0},mt_{R0},mt_C$ | | | | |
| | 7 | $mt_{L0},mt_{R0},mt_C$ | | | | |
| IIIf | 2 | | $mt_{L0},mt_{R0},mt_C$ | | | |
| | 6 | | $mt_{L0},mt_{R0},mt_C$ | | | |

It should be noted here that the masked thresholds in the positions not filled in in the tables 7 and 8 for the situations IIIb to IIIf are identical to the masked thresholds filled in in the corresponding positions in the situation IIIa. Further, when combining the situations IIIb and any other situation, such as IIIe, the selections given under the other situation (IIIe) should replace the selections given in IIIb.

From the tables 7 and 8 it is clear that the selection unit 28.1 requires at least the masked thresholds $mt_L$ and $mt_{L0}$. Further, additional masked thresholds $mt_C$, $mt_{S1}$ and $mt_{Sr}$ are required for carrying out the selection. When it relates to the embodiment of the situation IIIa (tca"=1), also the masked threshold $mt_R$ is required. Further, in the situation IIIe, also the masked threshold $mt_{R0}$ is required. FIG. 11 therefore shows schematically a connection between the outputs of the masked threshold determining units 26.1 to 26.7 and the selection unit 28.1. Dependent of the embodiment of the encoder apparatus discussed, that is: dependent of the situation given in the table, and dependent of the value for tca", the required masked thresholds given in the table will be supplied to the selection units 28. 1.

It is further clear from the tables 7 and 8 that the selection unit 28.2 requires at least the masked thresholds $mt_R$ and $mt_{R0}$. Further, the masked thresholds $mt_C$, $mt_{S1}$ and $mt_{Sr}$ are required for carrying out the selection. When it relates to the embodiment of the situation IIIa (tca=2), also the masked threshold $mt_L$ is required. Further, in the situation IIIf, also the masked threshold $mt_{L0}$ is required. FIG. 11 therefore shows schematically a connection between the outputs of the masked threshold determining units 26.1 to 26.7 and the selection unit 28.2. Dependent of the embodiment of the encoder apparatus discussed, that is: dependent of the situation given in the table, and dependent of the value for tca", the required masked thresholds given in the table will be supplied to the selection unit 28.2.

In an equivalent way, the outputs of the masked threshold determining units 26.1 to 26.7 are coupled to the selection units 28.3 to 28.5. Dependent of the embodiment of the encoder apparatus discussed, that is: dependent of the situation given in the table, and dependent of the value for tca", the required masked thresholds given in the table will be supplied to the selection units 28.3 to 28.5, respectively.

The encoder apparatus can be used in an apparatus for storing the signal supplied by the encoder apparatus on a storage medium, such as a record carrier. FIG. 12 schematically shows such a storage apparatus in the form of a recording apparatus. The block denoted by 190 is the encoder apparatus described above. The block denoted by 191 can be a channel encoder, if the channel encoder is not incorporated in the combining unit 24, 24.1 or 24.2. In the channel encoder, the signal applied to its input 192 is encoded in, as an example a Reed-Solomon encoder, and an interleaver, so as to enable an error correction to be carried out in the receiver. Further, again as an example, an 8-to-10 modulation well known in the art, see document (5) in the list of references, is carried out. The signal thus obtained is recorded in one track or a multiplicity of tracks on a record carrier 193, such as a magnetic or optical record carrier, by means of writing means 194, such as a magnetic or optical head 195. The storage medium may alternatively be a solid state memory.

Whilst the present invention has been described with respect to preferred embodiments thereof, it is to be understood that these are not limitative examples. Thus, various modifications may become apparent to those skilled in the art, without departing from the scope of the invention, as defined by the claims.

As an example, in the foregoing a description has been given in which the derivation of a selected masked threshold from at least two masked thresholds was realized by choosing the smallest one of the at least two masked thresholds. Sometimes, even the choice of the smallest one of the at least two masked thresholds does not lead to the quantisation noise being completely unaudible in the replicas of the signals obtained upon decoding. The derivation of the selected masked threshold is in such a situation not only a selection of the smallest masked threshold from a group of at least two masked thresholds, but in addition a number of decibels, such as 3(=10.log2) or 5(=10.log3) dB, is subtracted from the smallest masked threshold in order to obtain the selected masked threshold. Reference is made in this respect to earlier filed European patent application 96200937.9 (PHN 15.760) in the name of the same applicant as the present application, document (11) in the list of related documents.

The selection using the tca values can be realized on the wideband digital information signals, as supplied to the apparatus. It is however also possible to split the information signals each into a plurality of M subband signals, well known in the art, and to carry out the selection in each subband separately, using the tca values, on all the subband signals of the various information signals in said subband. This could mean that in one subband, the signal L is chosen as the first auxiliary signal, and that for another subband, another signal is chosen as the first auxiliary signal.

The transmitter apparatus may further be capable of generating an identification signal which is added to the transmission signal, which identifies that the transmission signal comprises information which is encoded in the way described above. A receiver may then be capable of detecting this identification signal, which informs the receiver that the signals received are encoded using masked thresholds derived from groups of at least two masked thresholds. The receiver may then decide to generate the composite signal for reproduction, as the composite signal is now also devoid of any audible quantisation noise.

Further, the invention lies in each and every novel feature or combination of features as herein disclosed.

List of related documents (1a) J.A.B.S., Vol. 40, No. 5, May 1992, pp. 376–382,
(1b) 'Matrixing of bitrate reduced audio signals' by
 W. R. Th. ten Kate et al, in Proc. of the ICASSP, 1992, March 23–26, San Francisco, Vol.2, pp. II-205 to II-208.
(2) U.S. Pat. appln. Ser. No. 08/427,646 (PHQ 93-002)
(3) EP-A 402,973 (PHN 13.241).
(4) EP-A 497,413A1 (PHN 13.581)
(5) U.S. Pat. No. 4,620,311 (PHN 11.117).
(6) European patent Application no. 400.755 (PHQ 89.018A).
(7a) EP-A 457,390 (PHN 13.328).
(7b) EP-A 457,391 (PHN 13.329).
(8) EP 678,226-A1 and U.S. Ser. No. 08/328,999 (PHN 14.615)
(9) ISO/IEC international standard IS 11172-3, Information technology - coding of moving pictures and associated audio for digital storage media up to about 1.5 Mbit/s, Part 3: audio.
(10) ISO/IEC international standard IS 13818-3, Information technology - coding of moving pictures and associated audio, Part 3: audio.
(11) European patent application no. 96200937.9 (PHN 15.760)

I claim:

1. An apparatus for encoding a plurality of n digital information signals, having first input means for receiving a first digital information signal, second input means for receiving a second digital information signal, third input means for receiving a third digital information signal, matrixing means for generating a first and a second digital composite signal from at least the first, second and third digital information signals, first and second data compression means for data compressing the first and second composite signals so as to obtain first and second data reduced digital composite signals, in response to first and second instruction signals respectively, first selection means for selecting at least one information signal from said plurality of n information signals so as to obtain at least a first auxiliary signal, at least a third data compression means for data compressing the at least first auxiliary signal so as to obtain a first data reduced auxiliary signal, in response to a third instruction signal, formatting means for combining the first and second data reduced composite signals and the at least first data reduced auxiliary signal into a transmission signal suitable for transmission via a transmission medium, wherein the apparatus further comprises:

at least first, second and third masked threshold determining means for determining a first masked threshold from the first digital information signal, a second masked threshold from the third digital information signal and a third masked threshold from a combination of at least the first and the third digital information signals, respectively, second selection means for deriving one masked threshold from the third masked threshold and at least one other masked threshold so as to obtain a first selected masked threshold, said first selected masked threshold being derived from a smallest of said third masked threshold and said at least one other masked threshold, and first instruction signal generator means for generating the first instruction signal in response to said first selected masked threshold, wherein n is an integer for which holds that n is larger than 2.

2. Apparatus as claimed in claim 1, characterized in that said at least one other masked threshold is the first masked threshold.

3. Apparatus as claimed in claim 1, n being equal to 3, wherein, if the first selection means have selected the first information signal to be the first auxiliary signal, the second selection means are further adapted to derive one masked threshold from at least the second and third masked threshold so as to obtain said first selected masked threshold.

4. Apparatus as claimed in claim 3, wherein the apparatus further comprises fourth masked threshold determining means for determining a fourth masked threshold from the second digital information signal, and wherein, if the first selection means have selected the first information signal to be the first auxiliary signal, the second selection means are further adapted to derive one masked threshold from the second, third and fourth masked threshold so as to obtain said first selected masked threshold.

5. Apparatus as claimed in claim 4, characterized in that said first selected masked threshold is derived from the smallest of the said second, third and fourth masked thresholds.

6. Apparatus as claimed in claim 3, characterized in that the apparatus further comprises fifth masked threshold determining means for determining a fifth masked threshold from a combination of at least the second and the third digital information signal, and wherein, if the first selection means (16) have selected the first information signal to be the first auxiliary signal, the second selection means are further adapted to derive one masked threshold from the second, third and fifth masked threshold so as to obtain said first selected masked threshold.

7. Apparatus as claimed in claim 6, characterized in that said first selected masked threshold is derived from the smallest of the said second, third and fifth masked thresholds.

8. Apparatus as claimed in claim 1, wherein the apparatus further comprises fourth and fifth masked threshold determining means for determining a fourth masked threshold from the second digital information signal and a fifth masked threshold from a combination of at least the second and the third digital information signal, respectively, third selection means for deriving one masked threshold from the fifth masked threshold and at least one other masked threshold so as to obtain a second selected masked threshold second instruction signal generator means for generating the second instruction signal in response to said second selected masked threshold.

9. Apparatus as claimed in claim 8, the apparatus further comprising fourth selection means and third instruction signal generator means, the fourth selection means are adapted to derive one masked threshold from a group of at least two masked thresholds so as to obtain a third selected masked threshold, one masked threshold in said group being the masked threshold derived from the first auxiliary signal, said third instruction signal generator means being adapted to generate the third instruction signal in response to said third selected masked threshold.

10. Apparatus as claimed in claim 8, further comprising fourth input means (4) for receiving a fourth digital information signal (S), wherein the third masked threshold determining means is adapted to derive the third masked threshold from a combination of at least the first, the third and the fourth digital information signal, and wherein the fifth masked threshold determining means is adapted to derive the fifth masked threshold from a combination of at least the second, the third and the fourth digital information signal, the apparatus further comprising sixth masked threshold determining means for determining a sixth masked threshold in response to the fourth digital information signal, the matrixing means being adapted to generate a first and a second digital composite signal from at least the first, second, third and fourth digital information signals, the first selection means being adapted to select at least a first and a second information signal from said at least first to fourth information signals so as to obtain the first and at least a second auxiliary signal, fourth data compression means for data compressing the second auxiliary signal so as to obtain a second data reduced auxiliary signal, in response to a fourth instruction signal, fourth instruction signal generator means for generating the fourth instruction signal, the formatting means being adapted to combine the first and second data reduced composite signals and the at least first and second data reduced auxiliary signals into a transmission signal suitable for transmission via a transmission medium.

11. Apparatus as claimed in claim 10, where n equals 4, the second selection means being adapted to derive one masked threshold from a first group of at least two masked thresholds so as to obtain the first selected masked threshold, the third selection means being adapted to derive one masked threshold from a second group of at least two masked thresholds so as to obtain the second selected masked threshold, the fourth selection means being adapted to derive one masked threshold from a third group of at least two masked thresholds so as to obtain the third selected masked threshold, the apparatus further comprising fifth selection means, the fifth selection means are adapted to derive one masked threshold from a fourth group of at least two masked thresholds so as to obtain a fourth selected masked threshold, said fourth instruction signal generator means being adapted to generate the fourth instruction signal in response to said fourth selected masked threshold.

12. Apparatus as claimed in claim 11, where $n \geq 5$, further comprising fourth input means for receiving a fourth digital information signal and fifth input means for receiving a fifth digital information signal, wherein the third masked threshold determining means is adapted to derive the third masked threshold from a combination of at least the first, the third and the fourth digital information signal, and wherein the fifth masked threshold determining means is adapted to derive the fifth masked threshold from a combination of at least the second, the third and the fifth digital information signal, the apparatus further comprising sixth masked threshold determining means for determining a sixth masked threshold in response to the fourth digital information signal, seventh masked threshold determining means for determining a seventh masked threshold in response to the fifth digital information signal, the matrixing means being adapted to generate a first and a second digital composite signal from the first, second, third, fourth and fifth digital information signals, the first selection means being adapted to select a first, second and third information signal from said first to fifth information signals so as to obtain the first, the second and a third auxiliary signal, fourth data compression means for data compressing the second auxiliary signal so as to obtain a second data reduced auxiliary signal, in response to a fourth instruction signal, fifth data compression means for data compressing the third auxiliary signal so as to obtain a third data reduced auxiliary signal, in response to a fifth instruction signal, fourth instruction signal generator means for generating the fourth instruction signal, fifth instruction signal generator means for generating the fifth instruction signal, the formatting means being adapted to combine the first and second data reduced composite signals and the first, second and third data reduced auxiliary signals into a transmission signal suitable for transmission via a transmission medium.

13. Apparatus as claimed in claim 12, wherein the second selection means is adapted to derive one masked threshold from a first group of at least two masked thresholds so as to obtain the first selected masked threshold, the third selection means being adapted to derive one masked threshold from a second group of at least two masked thresholds so as to obtain the second selected masked threshold, the fourth selection means being adapted to derive one masked threshold from it third group of at least two masked thresholds so as to obtain the third selected masked threshold, the apparatus further comprising fifth selection means being adapted to derive one masked threshold from a fourth group of at least two masked thresholds so as to obtain a fourth selected masked threshold, sixth selection means being adapted to derive one masked threshold from a fifth group of at least two masked thresholds so as to obtain a fifth selected masked threshold.

14. Apparatus as claimed in claim 12, further provided with calculation means for calculating an amount of data reduction to be achieved when selecting three of the first, second, third, fourth and fifth information signals as the first, second and third auxiliary signals, the calculation means being further adapted to generate a selection control signal indicating that group of three information signals selected from the first, second, third, fourth and fifth information signals selected as the first, second and third auxiliary signals that results in the largest amount of data reduction to be achieved, the first selection means being adapted to receive the selection control signal and to select said group of three information signals from the first, second, third, fourth and fifth information signals in response to said selection control signal.

15. Apparatus as claimed in claim 10, further provided with calculation means for calculating an amount of data reduction to be achieved when selecting two of the first, second, third and fourth information signals as the first and second auxiliary signals, the calculation means being further adapted to generate a selection control signal indicating that group of two information signals selected from the first, second, third and fourth information signals selected as the first and second auxiliary signals that results in the largest amount of data reduction to be achieved, the first selection means being adapted to receive the selection control signal and to select said group of two information signals from the first, second, third and fourth information signals in response to said selection control signal.

16. Apparatus as claimed in claim 1, further provided with calculation means for calculating an amount of data reduction to be achieved when selecting the first, or the second or the third information signal as the first auxiliary signal, the calculation means being further adapted to generate a selection control signal indicating that one signal of the first, second or third information signal selected as the first auxiliary signal that results in the largest amount of data reduction to be achieved, the first selection means being adapted to receive the selection control signal and to select said one of the first, second or third information signal in response to said selection control signal.

17. Apparatus as claimed in claim 16, wherein the formatter means is further adapted to combine the selection control signal into the transmission signal.

18. Apparatus as claimed in claim 1 further provided with writing means for writing the transmission signal into a storage medium, such as a record carrier.

19. Apparatus as claimed in anyone of the claim 1, characterized in that the apparatus is further adapted to generate an identification signal, for identifying the transmission signal generated by the apparatus.

20. Method of encoding a plurality of digital information signals comprising the steps of:

receiving a first digital information signal, receiving a second digital information signal, receiving a third digital information signal, generating first and second digital composite signals from at least the first, second and third digital information signals, data compressing the first and second composite signals so as to obtain first and second data reduced digital composite signals, in response to first and second instruction signals respectively, selecting at least one information signal from said plurality of n information signals so as to obtain at least a first auxiliary signal, data compressing the at least first auxiliary signal so as to obtain a first data reduced auxiliary signal, in response to a third instruction signal, combining the first and second data reduced composite signals and the at least first data reduced auxiliary signal into a transmission signal suitable for transmission via a transmission medium, wherein the method further comprises the steps of:

determining a first masked threshold from the first digital information signal, a second masked threshold from the third digital information signal and a third masked threshold from a combination of at least the first and the third digital information signals, respectively, deriving one masked threshold from the third masked threshold and at least one other masked threshold so as to obtain a first selected masked threshold, said first selected masked threshold being derived from a smallest of the third masked threshold and said at least one other masked threshold, generating the first instruction signal in response to said first selected masked threshold, wherein n is an integer for which holds that n is larger than 2.

21. Method as claimed in claim 20, further comprising the step of writing the transmission signal into a storage medium, such as a record carrier.

22. Apparatus for encoding a plurality of n digital information signals, where n≧3, comprising:

input means for receiving the n digital information signals, matrixing means for generating m digital composite signals from the n digital information signals, where m≧1, data compression means for data compressing the m composite signals so as to obtain m data reduced digital composite signals, in response to m instruction signals respectively, first selection means for selecting n−m information signals from said plurality of n information signals so as to obtain n−m auxiliary signals, data compression means for data compressing the n−m auxiliary signals so as to obtain n−m data reduced auxiliary signals, in response to n−m instruction signals respectively, formatting means for combining the m data reduced composite signals and the n−m data reduced auxiliary signals into a transmission signal suitable for transmission via a transmission medium, wherein the apparatus further comprises:

masked threshold determining means for determining n+m masked thresholds, each one of n of said masked thresholds being derived from a corresponding one of the n digital information signals, the remaining m of the n+m masked thresholds being derived from combinations of signals from m different subgroups of information signals chosen from the n digital information signals, selection means for deriving n selected masked thresholds from the group of n+m masked thresholds, one of said n selected masked thresholds being derived from a smallest of said n+m masked thresholds, instruction signal generator means for generating the n instruction signals in response to said n selected masked thresholds respectively.

23. Apparatus as claimed in claim 22, wherein the selection means are adapted to derive a selected masked threshold from a subgroup of at least two masked thresholds from the group of n+m masked thresholds.

24. Apparatus for encoding a plurality of n digital information signals, where $n \geq 3$, having:

input means for receiving the n digital information signals, matrixing means for generating first and second digital composite signals from the n digital information signals, data compression means for data compressing the first and second composite signals so as to obtain first and second data reduced digital composite signals, in response to first and second instruction signals respectively, first selection means for selecting n−2 information signals from said plurality of n information signals so as to obtain n−2 auxiliary signals, data compression means for data compressing the n−2 auxiliary signals so as to obtain n−2 data reduced auxiliary signals, in response to n−2 instruction signals respectively, formatting means for combining the first and second data reduced composite signals and the n−2 data reduced auxiliary signals into a transmission signal suitable for transmission via a transmission medium, wherein the apparatus further comprises:

masked threshold determining means for determining n+2 masked thresholds, each one of n of said masked thresholds being derived from a corresponding one of the n digital information signals, the remaining two of the n+2 masked thresholds being derived from a first and a second combination of signals from different subgroups of information signals chosen from the n digital information signals, selection means for deriving n selected masked thresholds from the group of n+2 masked thresholds, one of said n selected masked thresholds being derived from a smallest of said n+2 masked thresholds, instruction signal generator means for generating the n instruction signals in response to said n selected masked thresholds respectively.

25. Apparatus as claimed in claim 24, wherein the selection means are adapted to derive a selected masked threshold from a subgroup of at least two masked thresholds from the group of n+2 masked thresholds.

26. Apparatus for encoding a plurality of n digital information signals, where n>3, having:

input means for receiving the n digital information signals, matrixing means for generating first and second digital composite signals from the n digital information signals, data compression means for data compressing the first and second composite signals so as to obtain first and second data reduced digital composite signals, in response to first and second instruction signals respectively, first selection means for selecting n−2 information signals from said plurality of n information signals so as to obtain n−2 auxiliary signals, data compression means for data compressing the n−2 auxiliary signals so as to obtain n−2 data reduced auxiliary signals, in response to n−2 instruction signals respectively, formatting means for combining the first and second data reduced composite signals and the n−2 data reduced auxiliary signals into a transmission signal suitable for transmission via a transmission medium, wherein the apparatus further comprises:

masked threshold determining means for determining at least n masked thresholds, each one of n of said masked thresholds being derived from a corresponding one of the n digital information signals, selection means for deriving at least one selected masked threshold from the group of said at least n masked thresholds, said one selected masked threshold being derived from a smallest of said at least n masked thresholds, instruction signal generator means for generating one instruction signal of the n instruction signals in response to said one selected masked thresholds.

* * * * *